United States Patent [19]

Schultz

[11] 4,249,166

[45] Feb. 3, 1981

[54] LINE SUPERVISION

[75] Inventor: Richard M. Schultz, Oakwood Hills, Ill.

[73] Assignee: Honeywell Inc., Minneapolis, Minn.

[21] Appl. No.: 954,517

[22] Filed: Oct. 25, 1978

[51] Int. Cl.³ ........................ G08B 29/00; G06F 7/00; H04Q 5/00

[52] U.S. Cl. .................................... 340/506; 340/505; 340/534; 340/151; 340/152 T; 179/5 R; 364/200; 364/900

[58] Field of Search ............. 340/506, 505, 518, 52 T, 340/152 R, 151, 508, 147 R, 163, 531, 534; 179/5 R, 5 P; 364/200, 900

[56] References Cited

U.S. PATENT DOCUMENTS

| | | | |
|---|---|---|---|
| 2,814,033 | 11/1957 | Meuhter | 340/511 |
| 3,516,063 | 6/1970 | Arkin et al. | 340/151 |
| 3,713,142 | 1/1973 | Getchell | 340/505 |
| 3,806,872 | 4/1974 | Odom | 340/505 |
| 3,815,093 | 6/1974 | Caretto et al. | 340/152 T |
| 3,927,404 | 12/1975 | Cooper | 340/518 |
| 3,978,475 | 8/1976 | Schmitz | 340/502 |
| 4,019,172 | 4/1977 | Srodes | 340/146.1 C |
| 4,107,656 | 8/1978 | Fainsworth | 340/163 |

*Primary Examiner*—John W. Caldwell, Sr.
*Assistant Examiner*—Donnie L. Crosland
*Attorney, Agent, or Firm*—Trevor B. Joike

[57] ABSTRACT

A security system for supervising the integrity of a communication line having a supervising apparatus which generates first and second random signals, compares these first and second randomly generated signals to provide a third signal and compares this third signal to a fourth signal, and a transponder, also connected to the line, which compares the first and second randomly generated signals to provide the fourth signal to the communication line. The use of randomly generated signals increases the difficulty of breaching line security such that, when the supervisory apparatus detects a difference between the third and fourth signals, it can provide an appropriate alarm, indication, or control.

11 Claims, 33 Drawing Figures

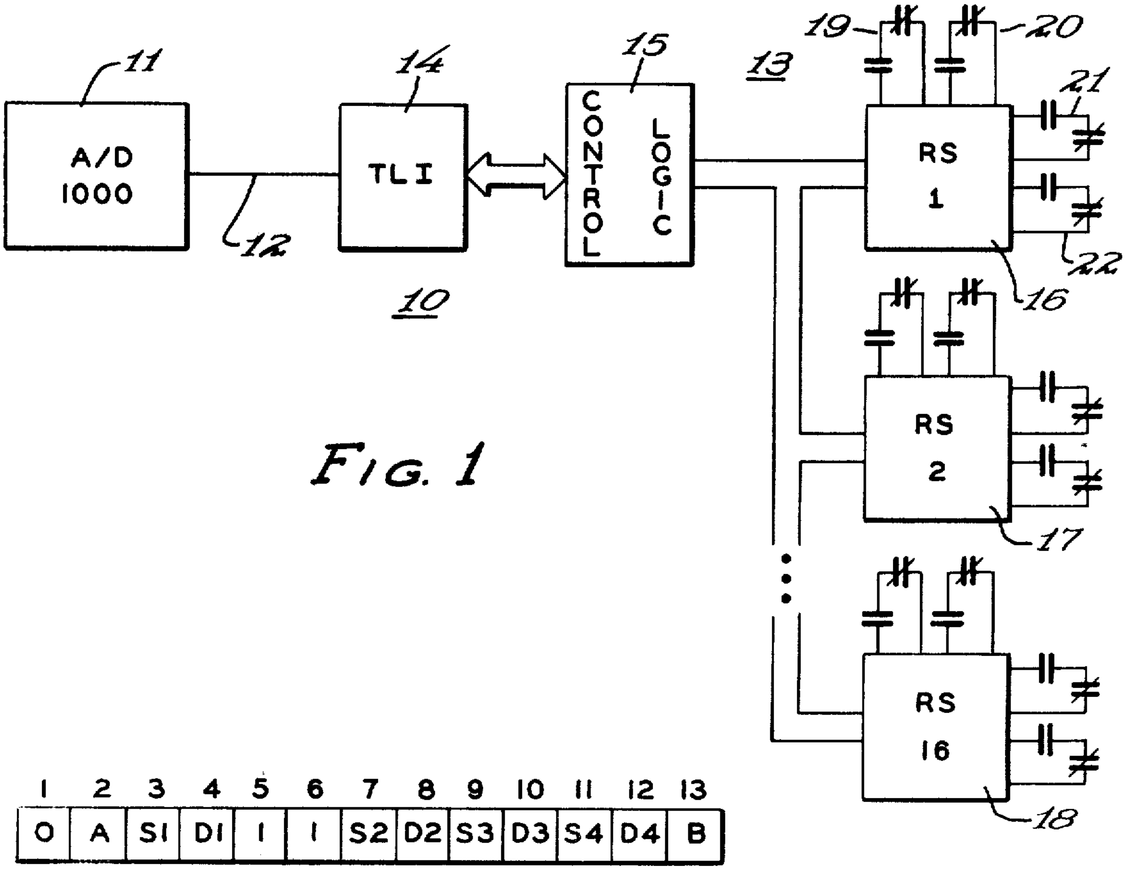
FIG. 1
| 1 | 2 | 3 | 4 | 5 | 6 | 7 | 8 | 9 | 10 | 11 | 12 | 13 |
|---|---|---|---|---|---|---|---|---|---|---|---|---|
| 0 | A | S1 | D1 | 1 | 1 | S2 | D2 | S3 | D3 | S4 | D4 | B |
A = AC POWER FAIL OR NO BATTERY
B = GROUND FAULT
S = ALARM
D = TROUBLE/ACCESS
FIG. 2
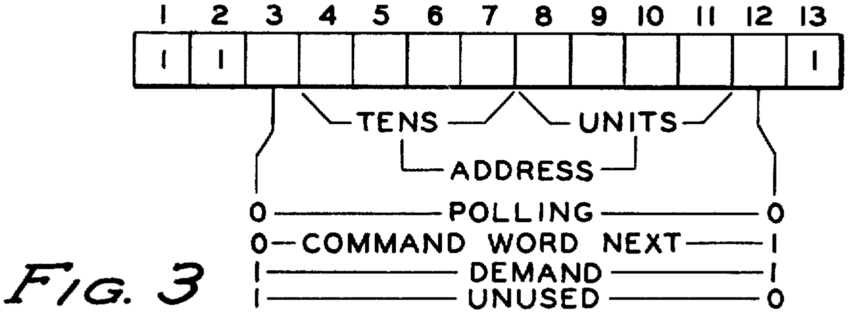
FIG. 3
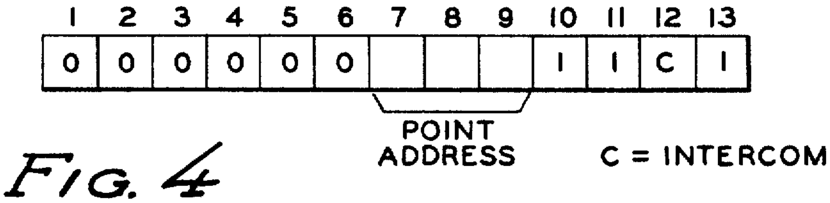
FIG. 4

LINE SUPERVISION

BACKGROUND OF THE INVENTION

This invention relates to the supervision of communication lines and, more particularly, to the use of randomly generated signals for detecting breaches in the security of a communication system.

Although alarm systems for the detection of fire and intrusions are well known in the art and although it is well known to monitor the integrity of the line running from the alarm indicator to the end of line element in order to assure that the line is not grounded or opened thus breaching security, the increased sophistication of the criminal makes it necessary to achieve a higher level of integrity supervision. Without supervision, it is a relatively easy matter for anyone who wishes to breach the security of the monitoring system to simply substitute an end of line device. However, wiring around the end of line device either adds or subtracts resistance from the alarm loops such that early integrity supervising systems merely monitored the current level of the alarm loop for detecting any changes in resistance of the line. However, if the limits of current to which the central monitor responds are known, it is a simple matter to insure that the current on the line remains the same when the security system is breached. Thus, there is a need for developing even more sophisticated integrity supervision systems.

The modern fire and security system typically comprises a computerized central processing and monitoring unit which digitally communicates with a plurality of remote stations each of which may have several alarm loops. When one of the loops in a remote station senses a fire or security condition, it raises an alarm flag, which may be a change of status signal, such that when the remote station is next polled by the central processing unit, the remote station will transmit its alarm information. During the polling operation, the central processing unit typically transmits a corresponding address to each of the remote stations requesting them to supply any information if any of their alarm loops have undergone a change in status since the last poll. The central processing unit will then display this alarm information on a printer or other form of visual display and may also provide an audible warning of the alarm condition. The remote station detects alarm conditions by monitoring the line current on each of its loops. Thus, the remote station is able to detect alarm conditions as well as open and short conditions on the line.

SUMMARY OF THE INVENTION

To provide a more sophisticated integrity supervision arrangement in a security system, a supervisory apparatus is provided for supplying first and second randomly generated signals to a communication line, for providing a third signal based upon the first and second randomly generated signals and for comparing the third signal to a fourth signal, and a transponder also connected to a communication line for receiving the first and second randomly generated signals, for comparing them and supplying to the communication line the fourth signal based upon the comparison. If the third and fourth signals are not in agreement, the supervisory apparatus provides an appropriate alarm signal.

In order to reduce the necessary amount of hardware at the remote station, common hardware is provided in one control logic circuit and the remaining hardware devoted specifically to the different remote stations is provided at each remote station. At each remote station is located its own address such that when the control logic receives an address from the central processing unit, the control logic sequentially compares the address of each remote station with the address received from the central processing unit. If there is an address match, then communication is opened to the remote station which has that address. If there is no address match in any of the remote stations connected to the control logic circuit, the control logic circuit goes back on standby status.

BRIEF DESCRIPTION OF THE DRAWINGS

These and other features and advantages will become apparent from a detailed consideration of the invention when taken in conjunction with the drawings in which:

FIG. 1 is a generalized block diagram of the invention;

FIG. 2 shows a message format for the response by a remote station such as that shown in FIG. 1 to the central station containing status information for the four loops connected thereto;

FIG. 3 shows an address word transmitted by the central processing unit to the control logic of FIG. 1;

FIG. 4 shows a command word transmitted by the central station to the control logic of FIG. 1;

Figure 5:
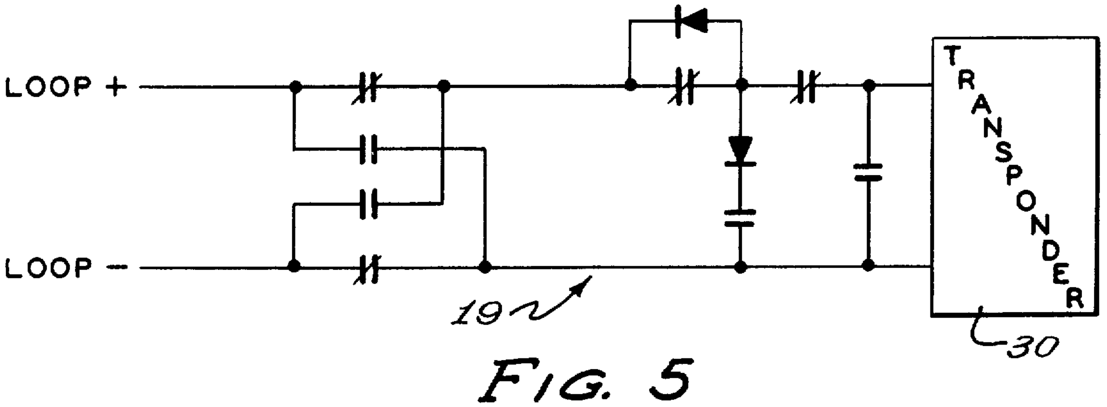
FIG. 5 shows a typical loop with its transponder for connection to a high security function module.

The circled terminals in each of the Figures show how the Figures interrelate.

DETAILED DESCRIPTION OF THE DRAWINGS

The communication system 10 shown in FIG. 1 comprises a central processing unit 11, which may be the Delta 1000 manufactured by Honeywell, connected over transmission line 12 to apparatus 13 which may be termed a "data gathering panel." Data gathering panel 13 is comprised of transmission line interface module 14 which is a standard module with the Alpha/Delta 1000, control logic 15 shown in more detail in FIGS. 9A–9G, and a plurality of remote stations or supervision means 16, 17 and 18 each of which may be comprised of circuitry shown more fully in FIGS. 6A–6G. Each remote station may have associated therewith four alarm loops such as loops 19, 20, 21 and 22.

Each alarm loop is shown in more detail in FIG. 5 and comprises a plurality of condition sensitive switches. These switches may include smoke detectors, heat detectors, rate of temperature rise detectors, manual boxes, water flow switches, intrusion alarms and normally open or normally closed security contacts, etc. Each zone of surveillance or loop is separately monitored for alarm, trouble and secure/access conditions. Up to 64 loops may be monitored when all 16 remote stations are used in data gathering panel 13. The opening or closing of these switches will affect line current which is sensed by the remote station for providing alarm information. Also connected at the end of each high security loop is a transponder which is shown in more detail in FIGS. 7A-7C. Each data gathering panel 13 requires one control logic module 15 for interfacing with from 1 to 16 remote stations 16, 17, 18.

When the control logic circuit 15 receives an address word such as that shown in FIG. 3, it successively interrogates each of the remote stations to which it is connected. The address word is comprised of 13 bits of information the first 2 bits of which indicate that this word is an address word. Bits 3 and 12 indicate whether the address word is requesting a polling operation. In the case of a poll, the control logic merely echoes the address word back to the central station 11 if no change of state has occurred in a remote station since the last poll, or the current status information is transmitted back to central station 11 if a change of state has occurred. Bits 3 and 12 also designate whether the next word is a command word, which sets the command latch in the control logic in preparation for a command word, or a demand word which transmits status information back to central station 11 just as if there had been a change of state during a polling operation. Bits 4 through 11 are the tens and units positions of the remote station address representing the remote station addressed by central station 11. Bit 13 is unused.

Control logic 15 reports back to central processing unit 11 in the format shown in FIG. 2. The word of FIG. 2 contains the standard 13 bits the first of which is not used. Bit 2 indicates whether there has been an AC power failure or a battery failure at the remote station which is being interrogated by the central station 11, Bits 3, 7, 9 and 11 provide alarm information for each of the four loops of the remote station, Bits 4, 8, 10 and 12 provide trouble indication when the remote station is being used for fire sensing or access information if the remote station is being used in a security application. Bits 5 and 6 are not used and are automatically set to a one and bit 13 indicates whether or not there is a ground fault at the interrogated remote station.

If on the other hand a command is to be performed by the remote station which has previously been addressed by the word of FIG. 3, the central processing unit 11 transmits a command word constructed such as that shown in FIG. 4 which is received by the remote station which previously has had its command latch set by Bits 3 and 12 of the address word shown in FIG. 3. The first 6 bits of the command word are 0 indicating a command word, Bits 7-9 indicate the point address of the point in the remote station which is to be commanded, Bits 10, 11 and 13 are extraneous and sent as logical ones, and Bit 12 indicates whether or not the intercom should be switched on or off. Each remote station is capable of receiving certain relay accessories each of which has a point address and will respond to the point address in the command word of FIG. 4 for switching on or off.

When the control logic 15 receives an address from central processing unit 11, it successively generates a module address to each of the stations 16-18. When a station senses its module address, it responds by supplying its remote station address to control logic 15 for comparison with the address received from the central processing unit. If there is a match, then the indicated action is taken.

The remote stations are responsible for supervising the integrity of each of the loops 19-22 associated therewith. For example, when the remote station 16 is initialized, in other words when power is initially supplied to remote station 16, it transmits a first randomly generated word down each of the loops, each loop receiving a separate word. This first word is known as a mask word and is stored in the transponder at the end of the loop. The remote station then randomly generates a second word which is stored in the transponder in data latches. The remote station compares both words to generate a third word and likewise the transponder compares both words to generate a fourth word. The transponder then transmits the fourth word back to the remote station which compares it to the third word. If the third and fourth words match, integrity of the alarm loop has been maintained. If there is no match, a breach has occurred and an alarm indication is given.

A typical remote station such as 16, 17 or 18 is shown in more detail in FIGS. 6A-6G and contains all of the circuitry required to implement four zones of high security supervision. Data flow between the remote station and the transponders connected at the end of the associated alarm loop is a modified interrogate/response type transmission. Data transmitted from the remote station is generated by the microprocessor and follows a digital random word format. All data follows a 13 bit double transmitted word format typical of the standard Honeywell universal asynchronous receiver transmitter. An example of such a receiver-transmitter is shown in U.S. Pat. No. 4,019,172.

Figure 6A:
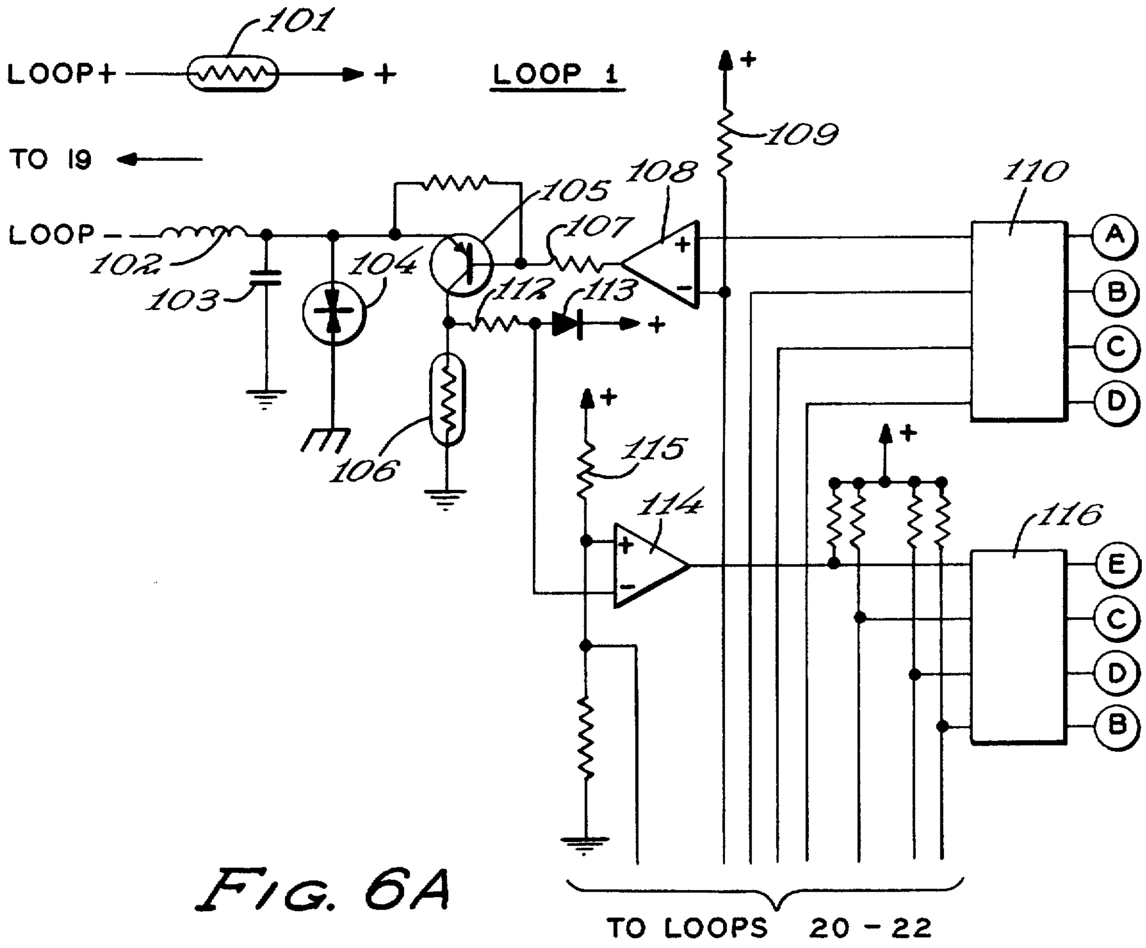
FIGS. 6A–6G show a typical remote station of FIG. 1 in detail.

The loop interface for one of the loops 19-22 is shown in more detail in FIG. 6A. The positive terminal of the loop, which is also shown in FIG. 5, is connected through a positive temperature coefficient thermistor 101 to a positive supply. PTC resistor 101 serves to protect the power supply in the event of loop fault. The negative terminal of the loop is connected through a static protection network comprising an inductor 102, capacitor 103 and a bidirectional Zener 104. Transistor 105, having an emitter connected to the common junction of inductor 102, capacitor 103 and Zener 104 and a collector connected through PTC resistor 106 to ground is the loop interrupter and enables the remote station to impress data on the loop. This transistor is normally forward biased through resistor 107 connected between its base and the output of comparator 108. When data is to be impressed in the loop, the comparator output is switched from a low to a high state. High loop current is a logical 1 and low loop current is a logical 0. With the comparator output high, transistor 105 is off and loop current falls to near 0. By pulsing the comparator output, data can then be transmitted. The inverting input of comparator 108 is connected to a positive source through resistor 109 and its data receiving non-inverting input is connected from a corresponding output of multiplexer 110. Multiplexer 110 has 3 other outputs each going to a corresponding comparator for the other corresponding loops. Input A to multiplexer 110 is connected to a corresponding terminal in FIG. 6B for receiving data which is to be transmitted over the loop. Input B is connected to the corresponding input in FIG. 6B for receiving the carrier signal of the universal asynchronous receiver transmitter 111. Terminals C and D also have corresponding terminals in FIG. 6B for selecting the output line over which data is to be transmitted from terminal A of transceiver 111.

Data transmitted from a transponder is received by monitoring loop current. When transistor 105 normally on, loop current flows through PTC thermistor 106. The junction of the collector of transistor 105 and thermistor 106 is connected through resistor 112 and diode 113 to a positive source and a junction of resistor 112 and diode 113 is connected to the inverting input of comparator 114 the non-inverting input of which is connected through resistor 115 to a positive source. The positive source through resistor 115 is also connected to the non-inverting terminals of the other comparators connected to the other loops. Resistor 112 and diode 113 are included as protection for the comparator input in the shorted loop configuration. The output from comparator 114 is connected to a corresponding input terminal of multiplexer 116 the other input terminals of which are connected to the other loops. Multiplexer 116 has an output terminal E which is connected to the receive data terminal, R DATA, of transceiver 111 shown in FIG. 6B, a terminal B which is connected to the carrier terminal of transceiver 111 and terminals C and D which are used to select the loop from which data is to be received.

Figure 6B:
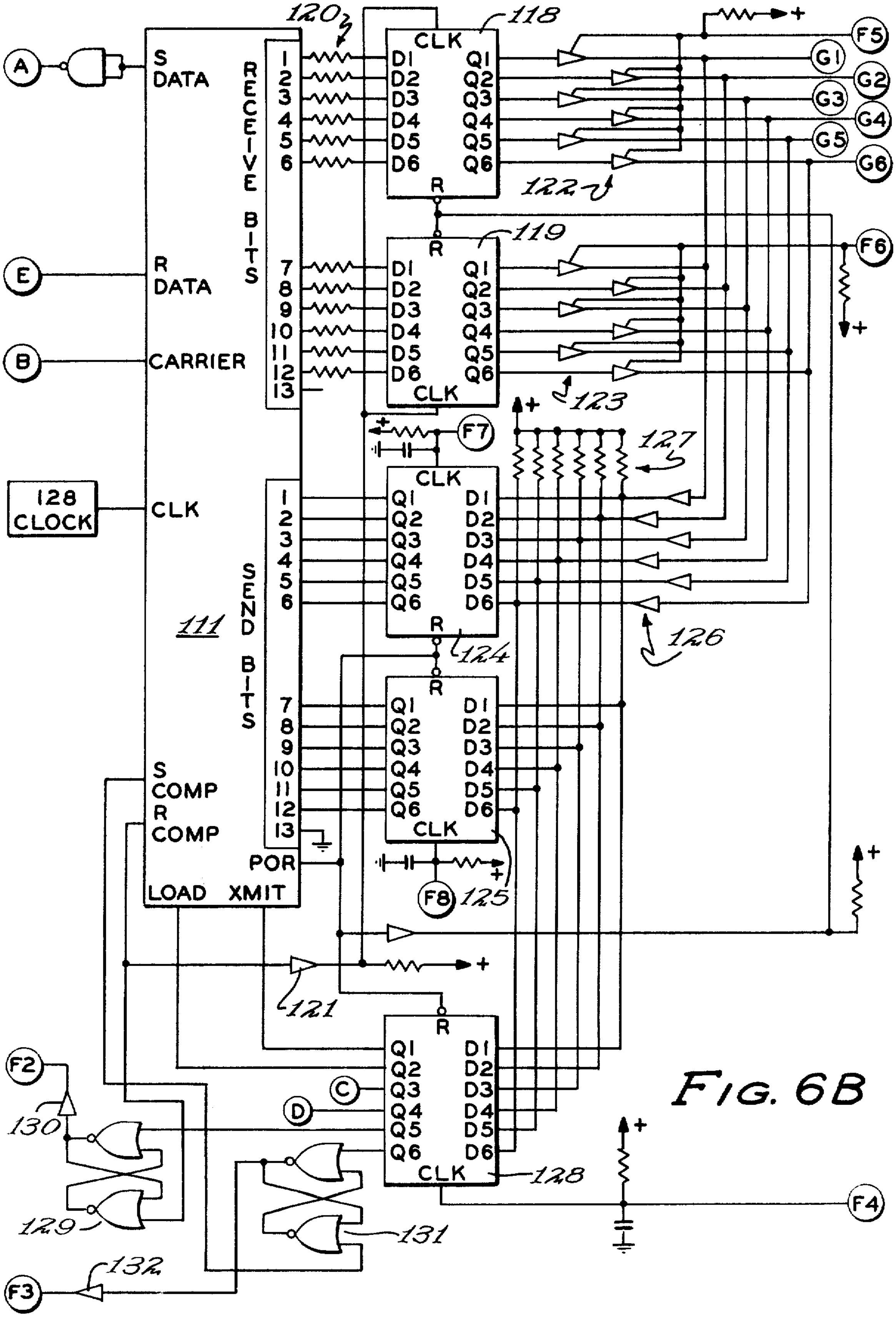
Figure 6C:
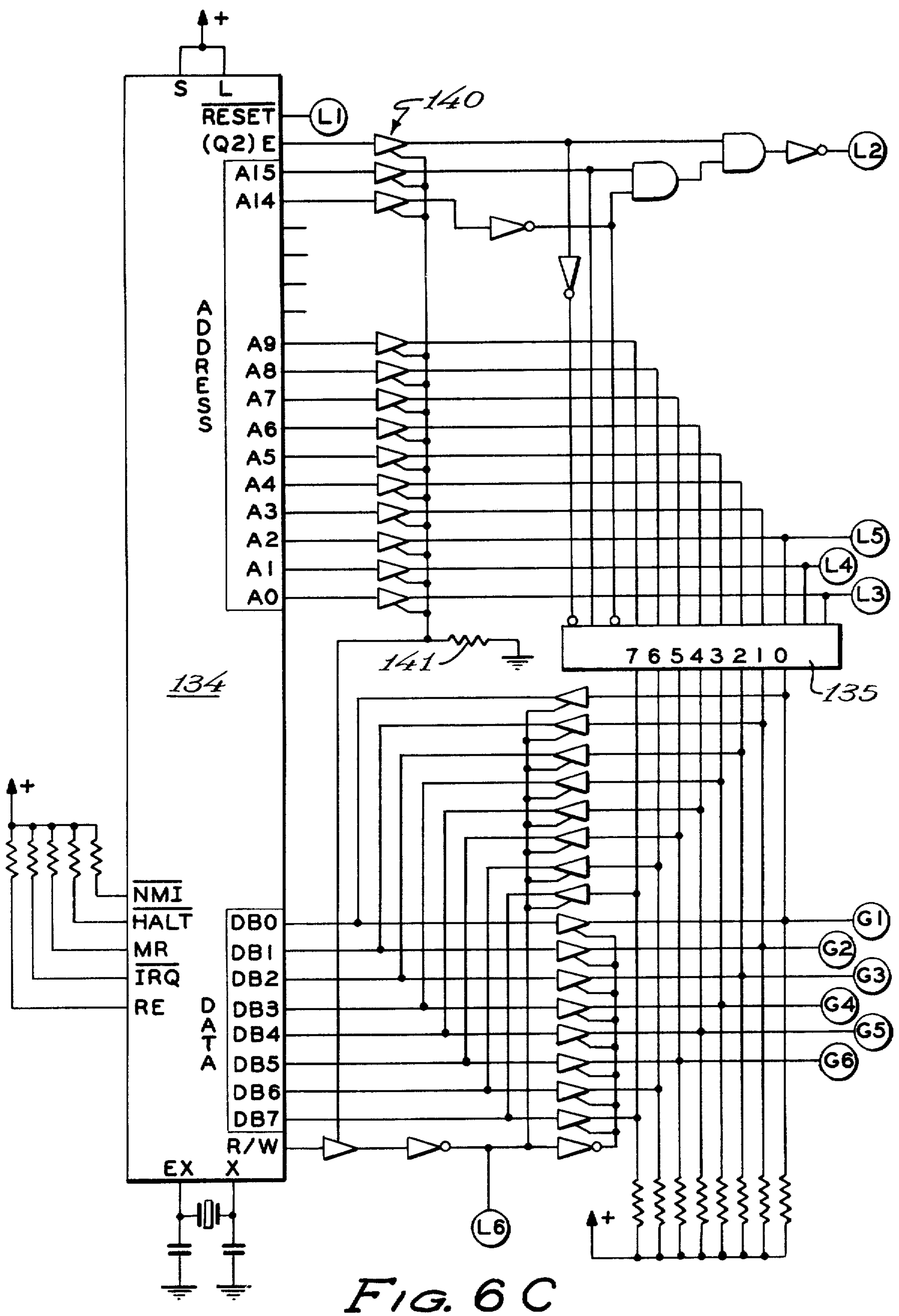
Figure 6D:
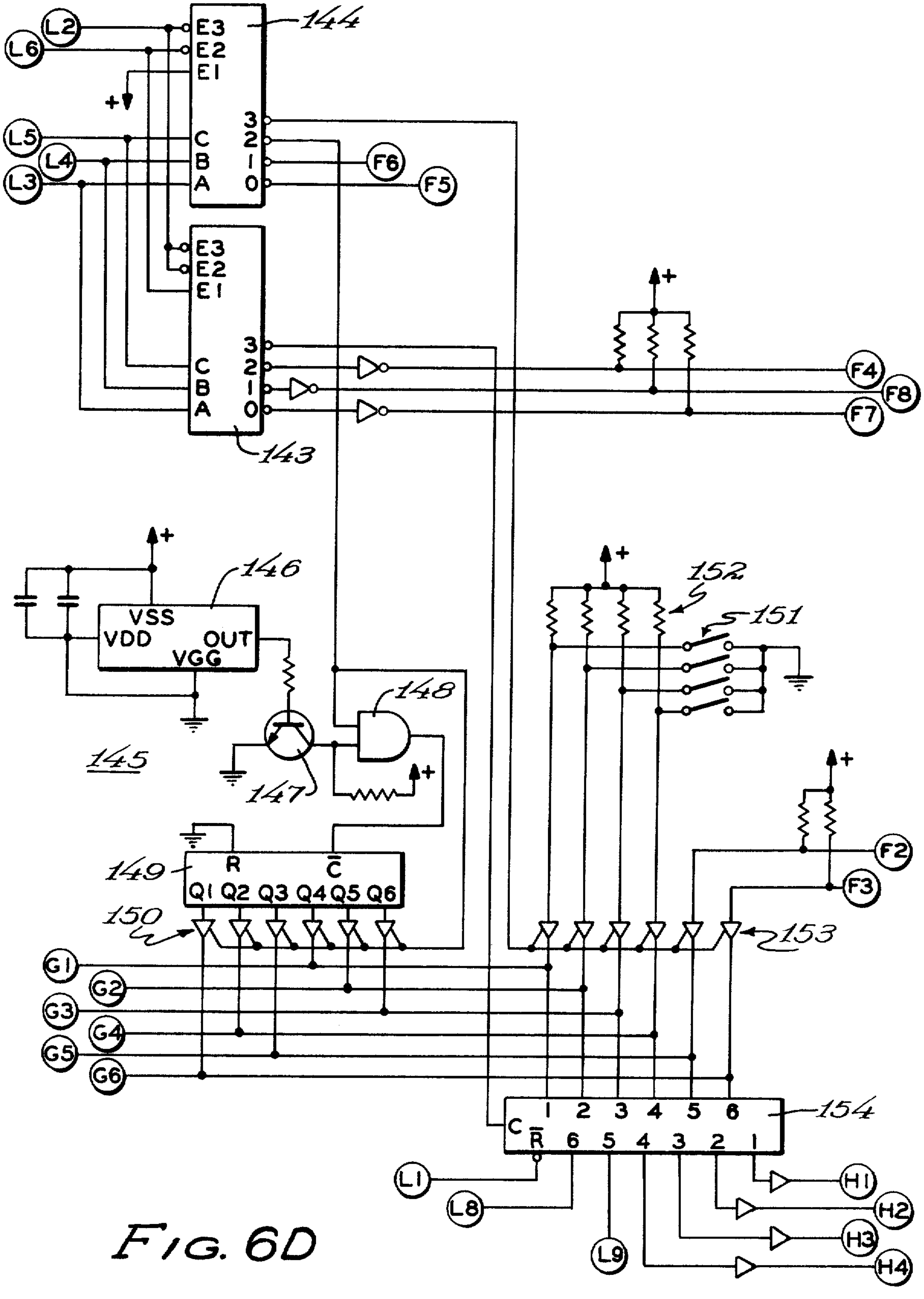

When data is received from the loop at terminal E of FIG. 6B, it is presented at RECEIVE BITS outputs 1–13 each of which, with the exception of bit 13, is connected to an input of latch 118 or latch 119 through a corresponding resistor 120. The data at the D inputs of latches 118 and 119 are clocked to their data Q outputs by a signal derived from the received complete, RCOMP, terminal of transceiver 111 through buffer 121. The output data lines from latches 118 and 119 are connected to output terminals G1–G6 through tristate hex buffers 122 and 123. As shown by terminals G1–G6, the outputs from buffers 122 and 123 are connected to the data input terminals of microprocessor 134 through tristate hex buffers as shown in FIG. 6C. By using the address outputs, this information may be read into the microprocessor by applying read signals over terminals F5 and F6 and the read/write (R/$\overline{W}$) terminal of processor 134 as shown in FIGS. 6B and 6C for enabling the hex buffers to supply the data from latches 118 and 119 to the data terminals of microprocessor 134. Data to be transmitted by transceiver 111 onto the loop is received over the same terminals G1–G6 to the inputs of latches 124 and 125 through a set of buffers 126 and pull up resistors 127 connected to corresponding outputs of buffers 126 and a positive voltage source. The data is clocked into latches 124 and 125 by write terminals F7 and F8 which, as shown in FIG. 6D, originate from microprocessor 134. The outputs from latches 124 and 125 are then connected to the send bits of transceiver 111 which converts this parallel information into serial form for transmission over terminal A to the alarm loop. A further latch 128 has 6 input terminals correspondingly connected through buffers 126 to terminals G1 and G6. The latching of any information from terminals G1 through G6 by latch 128 is controlled by terminal F4 also shown in FIG. 6D and generated by the microprocessor. Output Q1 of latch 128 provides the transmit signal to transceiver 111 causing it to transmit the data on its send bits 1–13 over terminal A once that data is loaded into the transceiver registers as controlled by output Q2 of latch 128. Terminals Q3 and Q4 are connected to terminals C and D of multiplexers 110 and 116 for selecting the loops in FIG. 6A over which this data is to be transmitted or received. Output terminal Q5 of latch 128 resets latch 129 which is used to supply through buffer 130 the receive complete signal from transceiver 111 to terminal F2. Output terminal Q6 of latch 128 supplies the reset signal to latch 131 which supplies the send complete signal from transceiver 111 through buffer 132 to terminal F3. Thus, the receipt and transmission of data by and from transceiver 111 and the selection of loops to transmit and receive this data are all under microprocessor control.

Figure 10:
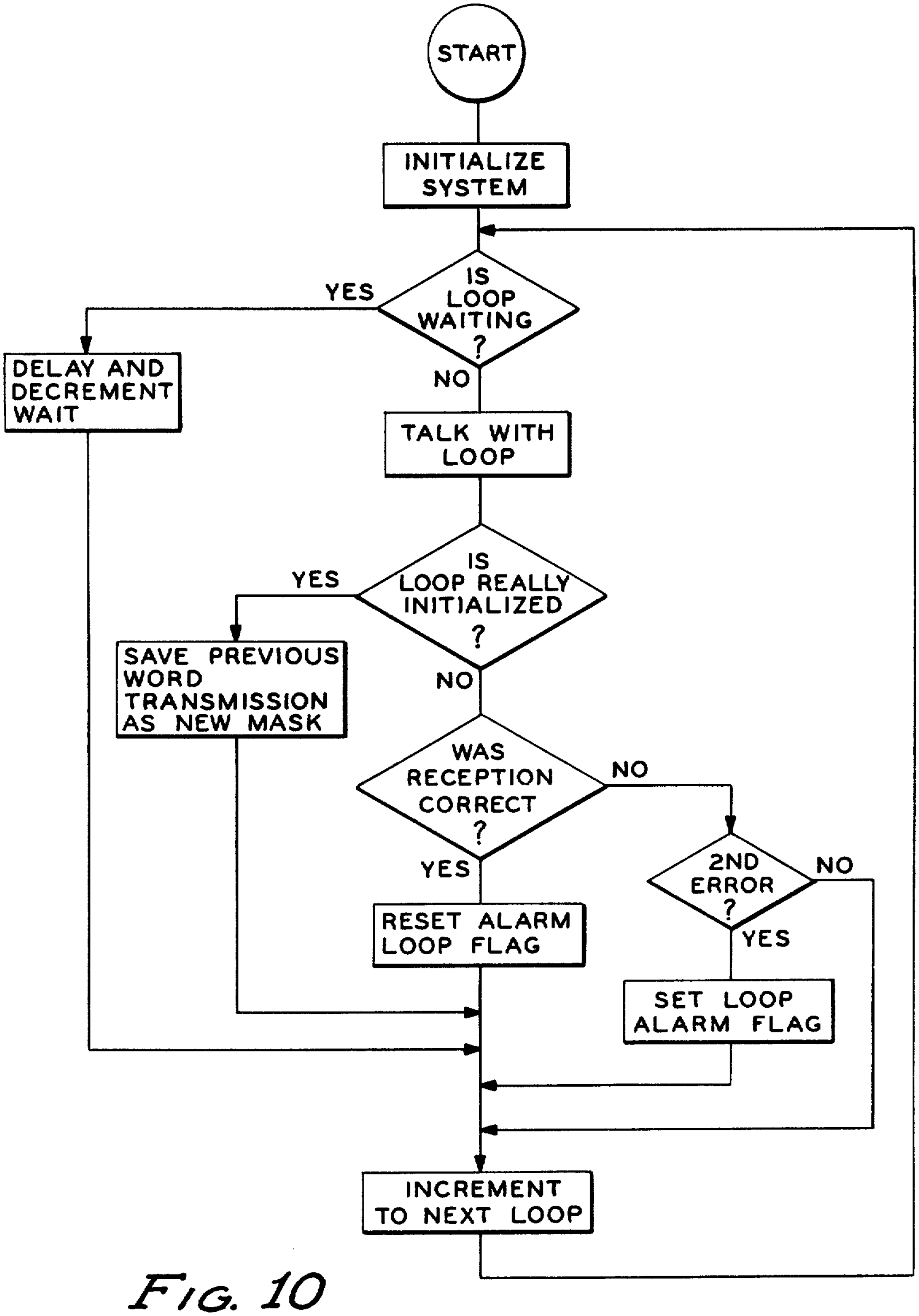
FIG. 10 shows the flow chart of the program for the microprocessor unit shown in FIG. 6C.

The microprocessor itself is shown as element 134 in FIG. 6C. Microprocessor 134 is a complete 8 bit microprocessor which may be an MC6802 manufactured by Motorola. Inputs $\overline{\text{NMI}}$, $\overline{\text{HALT}}$, MR, $\overline{\text{IRQ}}$ and RE shown in FIG. 6C are not required in this application and thus they are all terminated with pull up resistors connected to a source positive voltage as shown. The address lines together with line (Q2) E and the read/write line R/W are all connected through hex buffers 140 as shown which have their control terminals connected through resistor 141 to ground. Address lines A0–A9 are all connected to various inputs of a 3604 PROM 135 which is a 512×8 bipolar device containing the program the flow chart of which is shown in FIG. 10. In addition, the read/write output line R/W, address lines A0–A2 and A14 and A15 together with output line (Q2) E are all decoded by output decoders 143 and 144 (FIG. 6D) to provide a plurality of functions.

The lowest order output of decoder 143 is supplied through an inverter to terminal F7 which is a write terminal connected to latch 124 shown in FIG. 6B. The next order output from decoder 143 is likewise connected through an inverter to terminal F8 which is a write terminal connected to the clock terminal of latch 125 of FIG. 6B. The next order terminal is likewise connected through an inverter to terminal F4 which is a third write terminal connected to the clock terminal of latch 128 shown in FIG. 6B. The two lowest order output terminals of decoder 144 are connected to read terminals F5 and F6 which control hex buffers 122 and 123 of FIG. 6B. Output 2 of decoder 144 controls the random number generator 145 shown in FIG. 6D.

The random number generator comprises white noise source 146 operating through level shifting transistor 147 to provide one input to AND gate 148 the other input of which is controlled by output 2 from decoder 144. Thus, when output 2 is high, AND gate 148 allows the supply of clocking pulses from white noise source 146 to counter 149. By using a white noise source, the count of counter 149, even though it may be periodically stopped, is a random number. The outputs from counter 149 are connected through a tristate hex buffer 150 under the control of the output 2 from decoder 144 to impress upon inputs G1–G6 the random number which is connected through FIG. 6B for transmission by transceiver 111 over the selected loop.

Four pole switch 151 having pull up resistors 152, is connected to the inputs of a tristate hex buffer 153 having two further inputs from terminal F2 which comes from the receive complete latch of FIG. 6B and terminal F3 which comes from the send complete latch 131 of FIG. 6B. The tristate buffer is under the control of output 3 of decoder 144. When microprocessor wishes to read the information contained in switches 151 or terminals F2 and F3, it supplies an output to latch 153 for impressing this information on the data lines G1–G6. Data lines G1–G6 are also connected through register 154. Outputs 1–4 of this device are connected through buffers to terminals H1–H4 which provide alarm inputs to circuit 155 shown in FIG. 6F, which circuit will be explained more fully hereinafter. Outputs 5 and 6 are connected to terminals L9 and L8 respectively of Watchdog Timer 156 shown in FIG. 6E. Input $\overline{\text{R}}$ is connected to terminal L1 for resetting register 154.

Figure 6G:
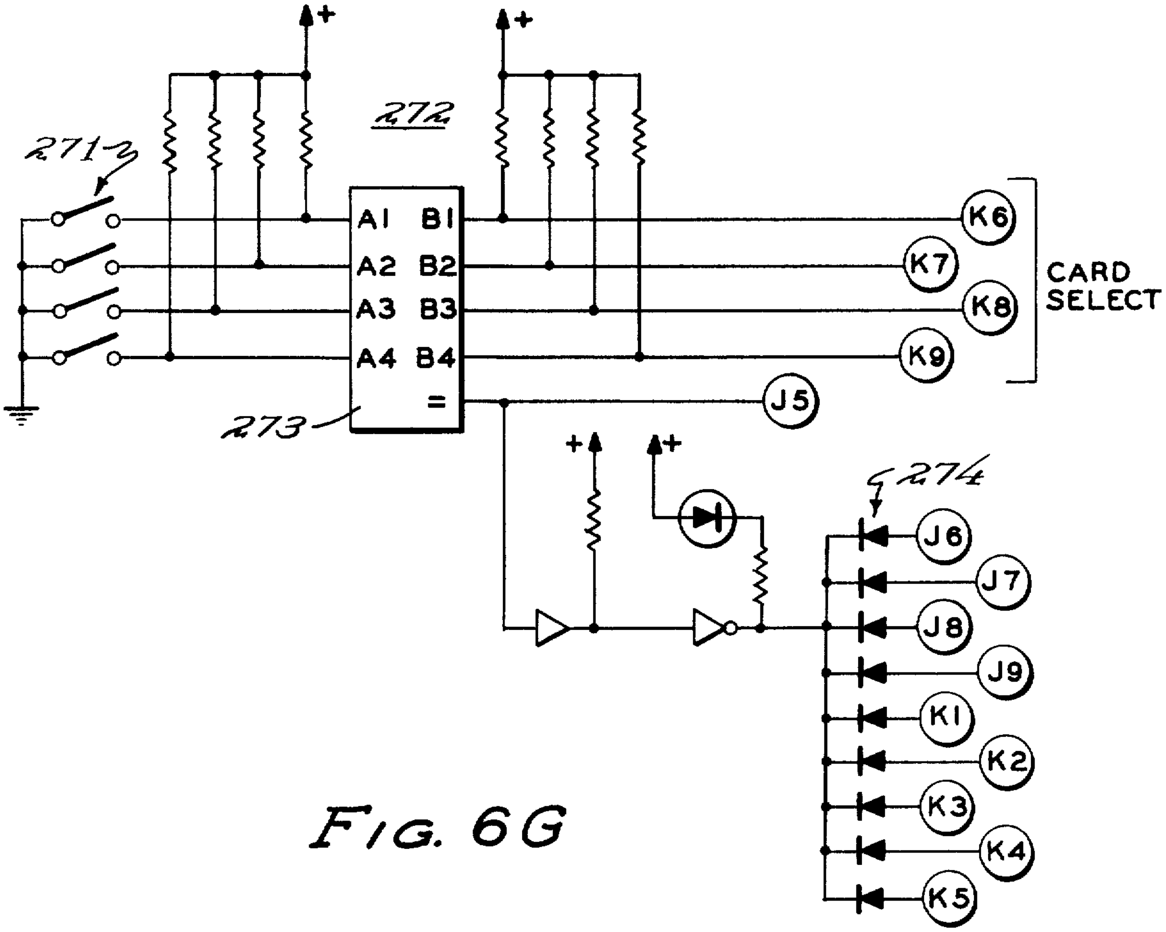
Figure 6E:
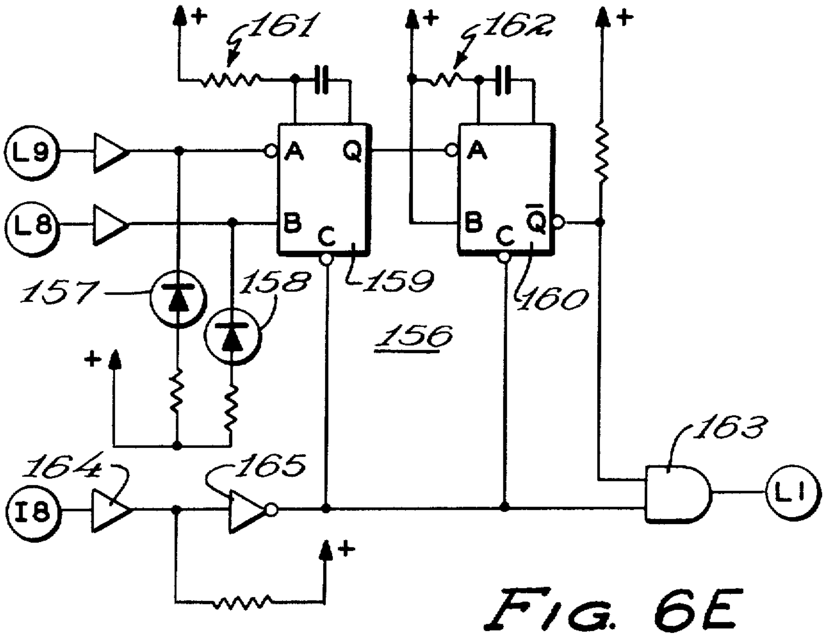

Watchdog Timer 156 shown in FIG. 6E monitors the operation of the remote station and particularly monitors the condition of the two indicator LEDs 157 and 158 as shown. Terminals L9 and L8 are connected through buffers to the two LEDs 157 and 158 respectfully which are each connected through a resistor to a positive source. The junction of the buffer and LED 157 is connected to the inverted A input of flip-flop 159 and the junction of the buffer connected to terminal L8 and LED 158 is connected to the B input. LED 158, when lit, indicates that the processor is in its initialization cycle. LED 157 is used to indicate looping, i.e. that the loops are continuously being checked for integrity. The normal status for LED 157 is to flash. Flip-flop 159 together with flip-flop 160 are connected in a retriggerable monostable multivibrator configuration with their time constants set by RC circuits 161 and 162 respectively. As long as terminal L9 continues to receive pulses, flip-flip 159 is repetitively retriggered and does not provide an output which will trigger flip-flop 160. However, if loop pulsing ceases, flip-flop 159 will time out to trigger flip-flop 160 for providing an output to AND gate 163 which operates together with an input from power on reset terminal I8 from circuit 155 shown in FIG. 6F. Terminal I8 is energized whenever power is initially turned on by the system. This terminal is connected through buffer 164 and inverter 165 to the inverted C terminals of both flip-flops 159 and 160 as well as the other input to AND gate 163. The output from AND gate 163 is connected not only to the reset terminal of register 154 shown in FIG. 6D but is also connected to the RESET terminal L1 of microprocessor 134 shown in FIG. 6C.

Microprocessor 134 periodically terminates the counting operation of counter 149 and reads its output count through buffer 150 to data lines G1–G6. It then addresses terminals F7 and F8 for latching this data into latches 124 and 125. Microprocessor 134 next supplies data to terminals G1–G6 and latches this data into latch 128 by providing an appropriate signal to terminal F4. Latch 128 provides the load pulse to load the random word into the appropriate registers of transceiver 111, selects the loop over which this random word is to be transmitted, and generates the transmit pulse for transmitting this information. The end of line transponder compares this signal with the mask word which was generated during initialization and transmits back the result which is received on the RDATA terminal E of FIG. 6B. A receive complete signal is generated through latch 129 which informs the microprocessor 134 over terminal F2 that there is data in transceiver 111 which can be read. This data is then read from the receive bits by addressing terminals F5 and F6. Microprocessor 134 will then compare the result received from the transponder with the result of a similar operation that it itself performs. If there is no match, microprocessor 134 will supply this information over terminals G1–G6 to register 154 under control of output 3 from decoder 143 for supply to the appropriate terminals H1–H4, each of which is devoted to a corresponding loop. These terminals are connected to corresponding terminals in FIG. 6F.

Circuit 155 receives these alarm inputs at terminals H1–H4 and communicates this information to control logic 15 shown in FIG. 1. In addition, circuit 155 receives certain inputs from control logic 15 for performing certain operations. For example, there are four command outputs which may be connected to corresponding relays for performing various functions. Likewise, there are four alarm outputs and four secure/access outputs which may be connected to relays. Terminals H5–H9, I1–I9 and J1–J5 all connect circuit 155 to control logic 15.

Figure 6F:
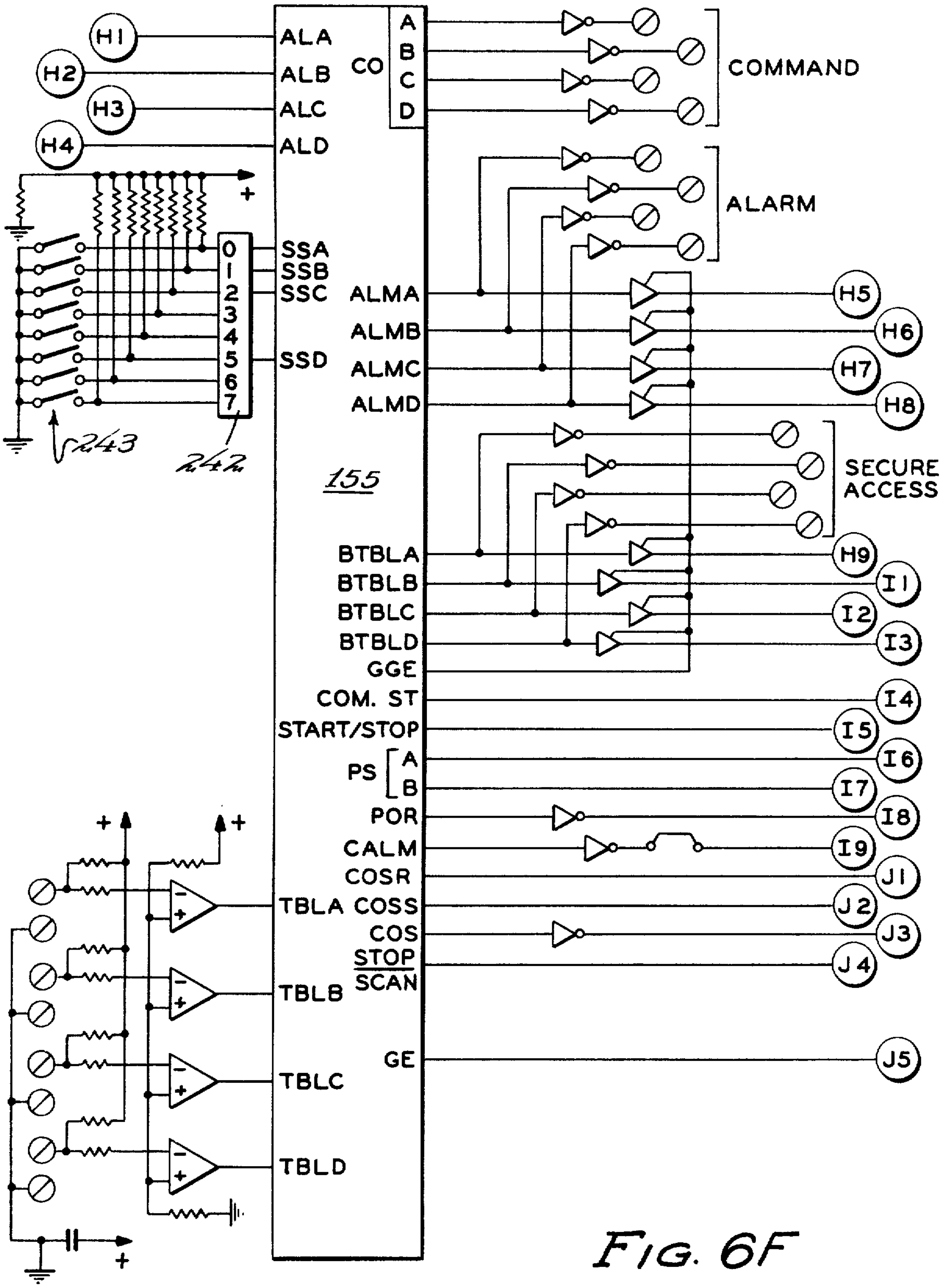
Figure 8A:
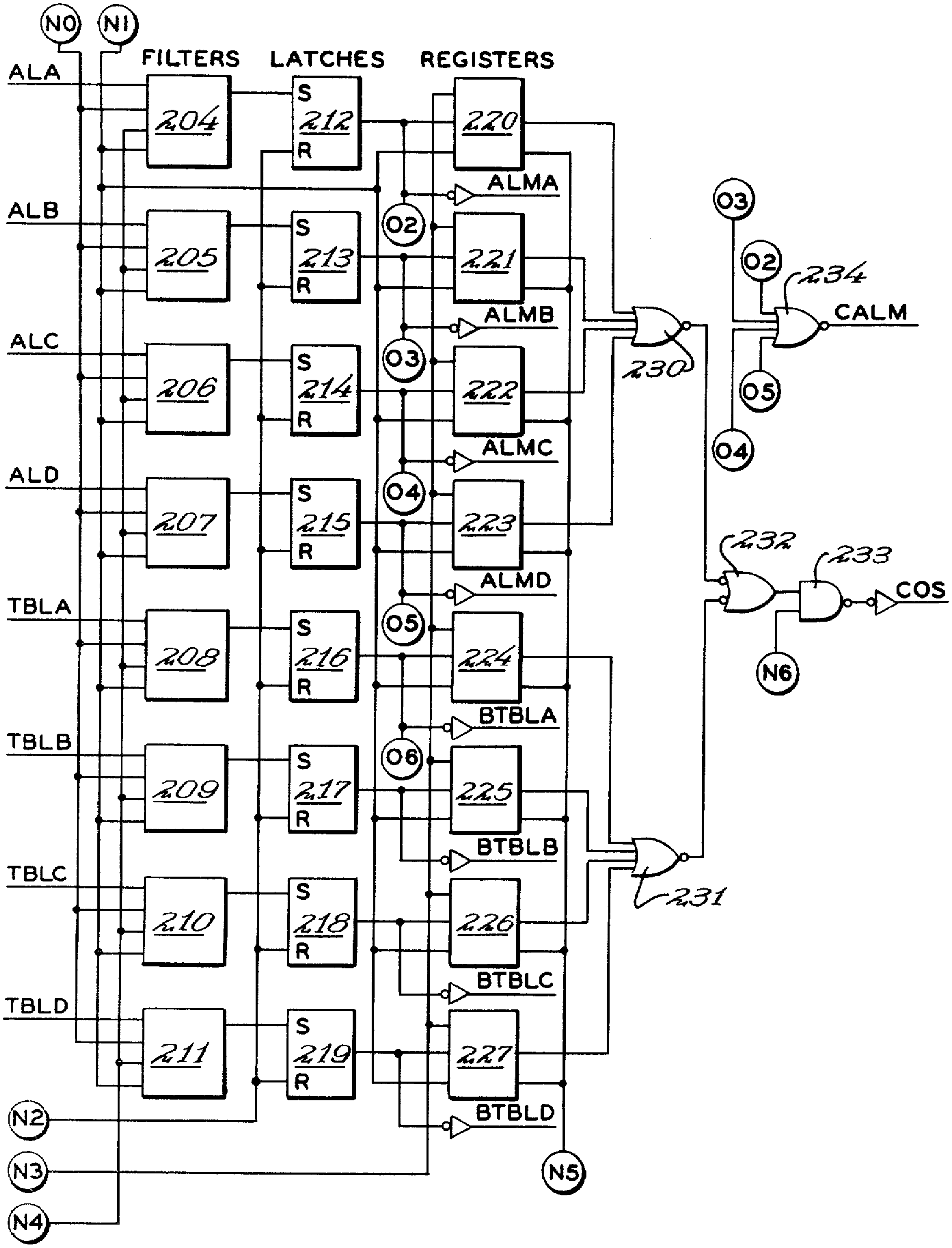
FIGS. 8A–8J show the details of circuit 155 shown in FIG. 6F.
Figure 8B:
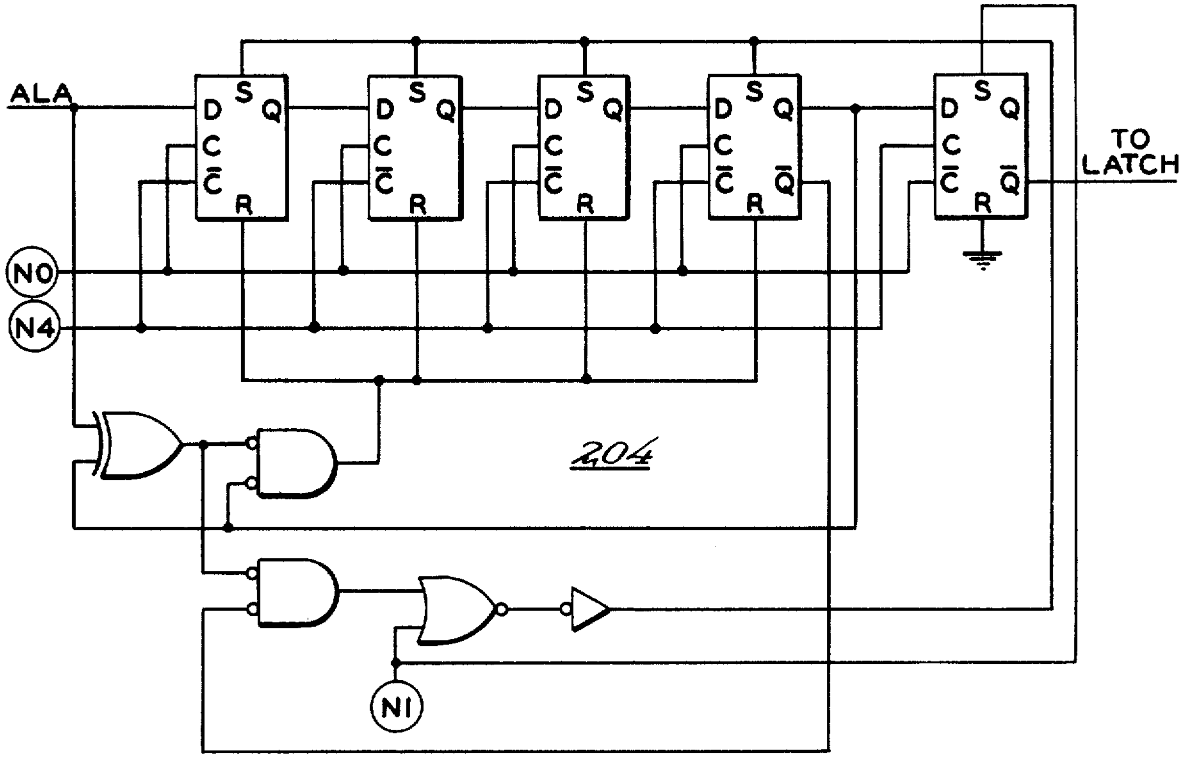
Figure 8C:
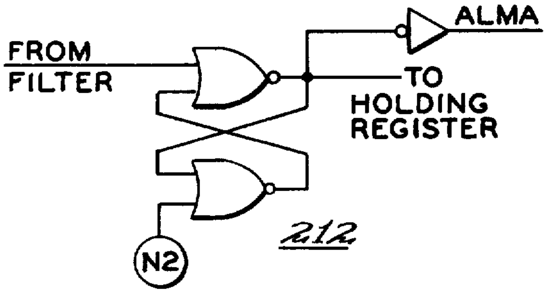
Figure 8D:
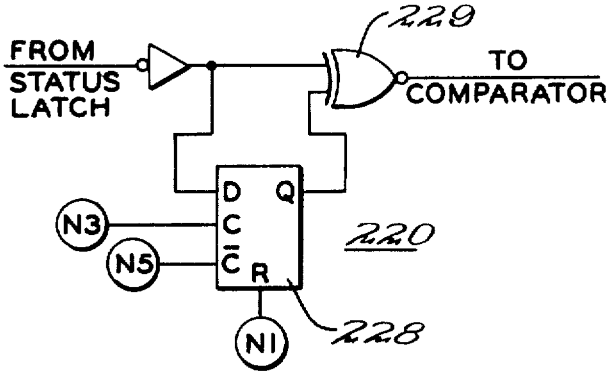
Figure 8H:
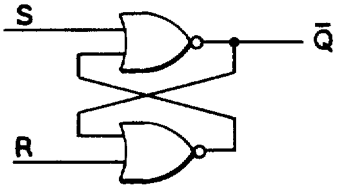
Figure 8G:
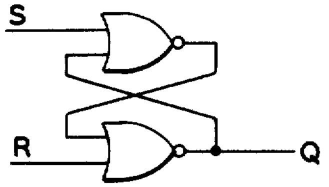
Figure 8E:
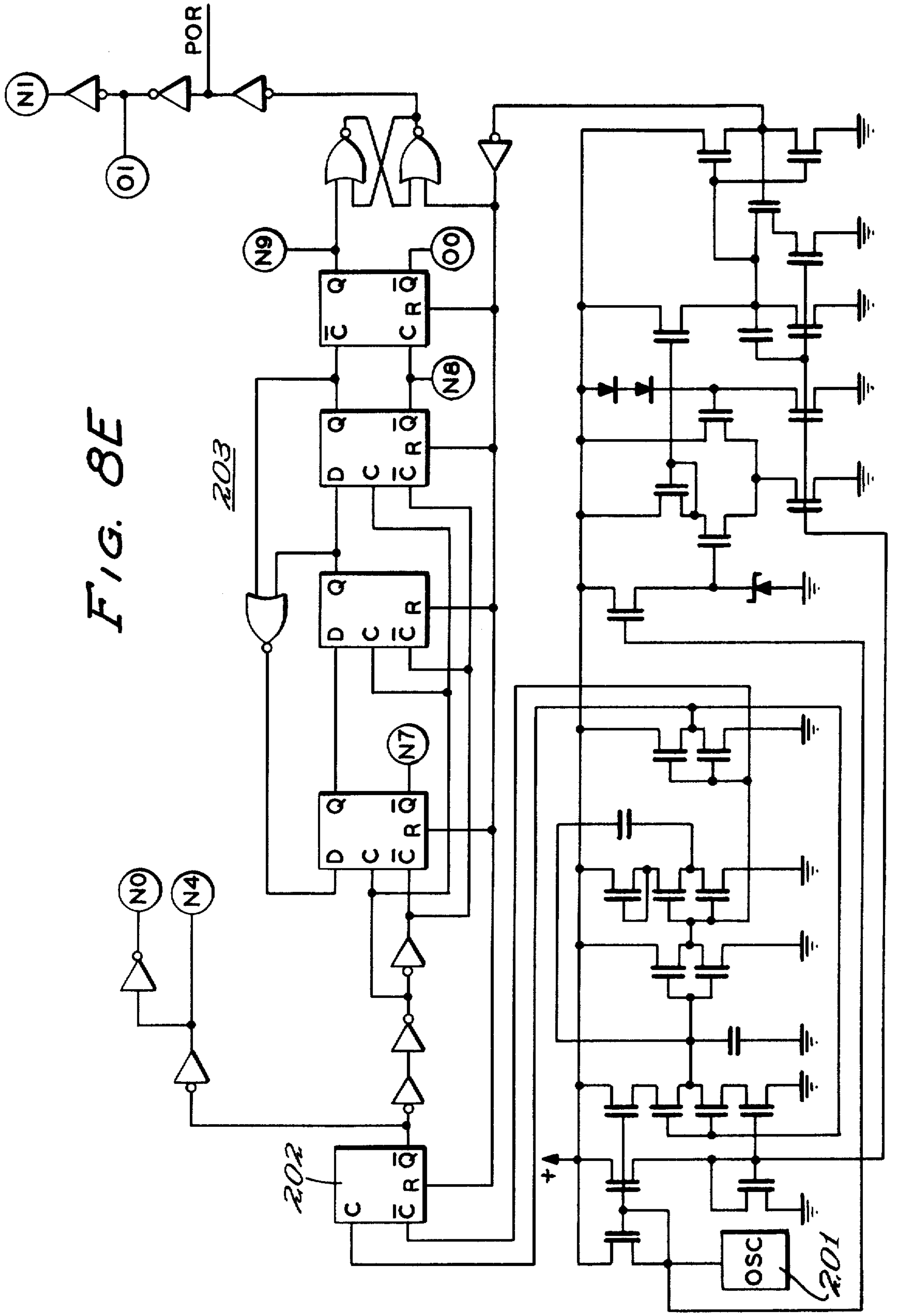

The details of circuit 155 are shown in more detail in FIGS. 8A–8J. The clock circuit used for controlling circuit 155 is shown in FIG. 8E and comprises oscillator 201 for driving solid state circuitry operating through a counter 202 for providing the N0 and N4 outputs and through a series of flip-flops 203 for providing the N7–N9 and 00 outputs. As shown in FIG. 8A, digital filters 204–207 receive corresponding alarm inputs which are terminals H1–H4 as shown in FIG. 6F and filters 208–211 receive trouble inputs such as those also shown in FIG. 6F. Digital filters 204–211 also receive a power on reset signal at terminal N1 as well as clocking signals from terminals N0 and N4. The digital filters have a 160–300 millisecond time constant. Since all of these filters are identical, only one of which has been set out in FIG. 8B. Functionally, the filter requires a steady state input signal lasting at least as long as its time constant before its output state changes. It is a non-inverting circuit element, such that when a steady state logic 1 appears at its input, its output will switch to a logic 1 approximately 200 milliseconds later.

Figure 8F:
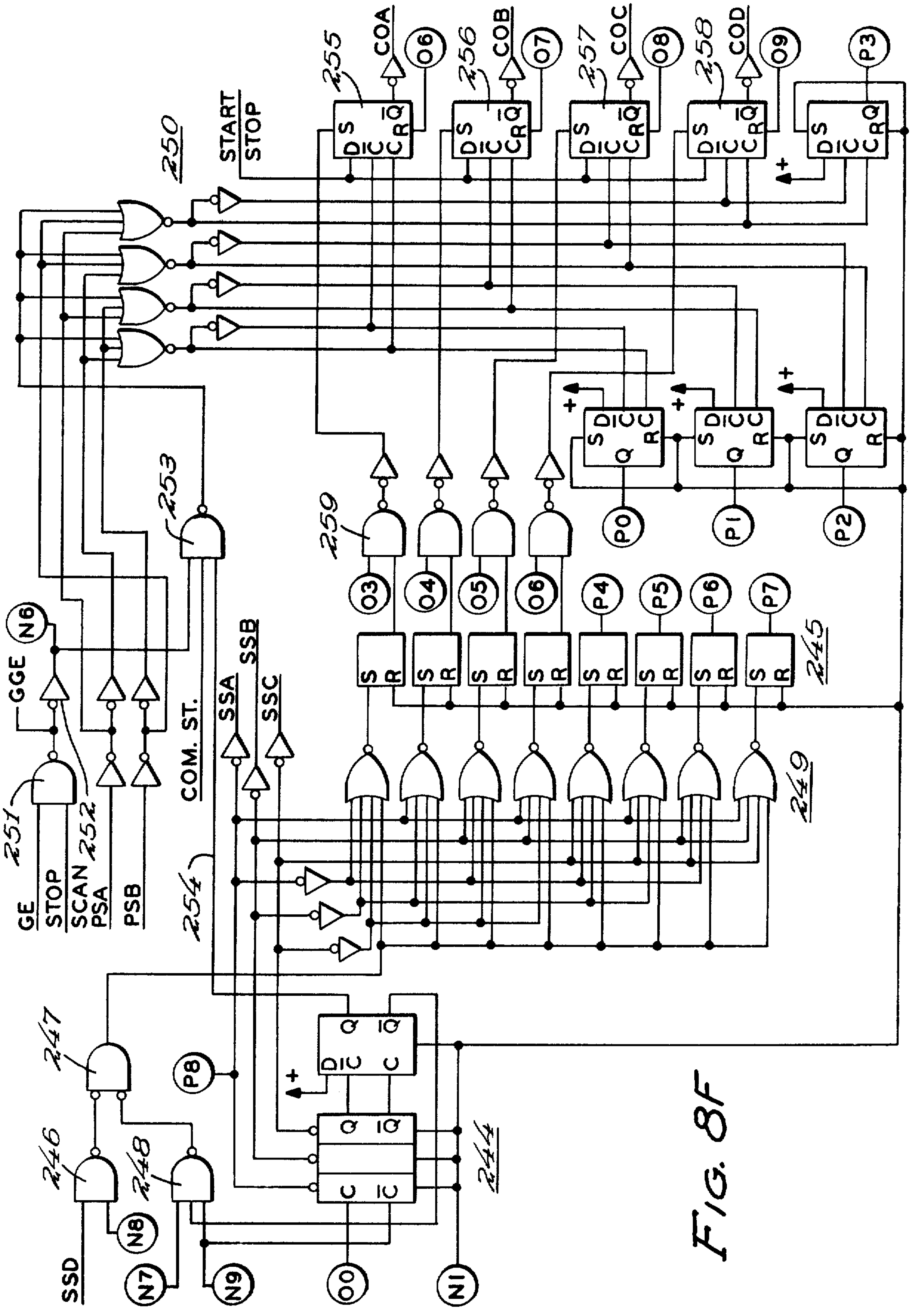
Figure 8J:
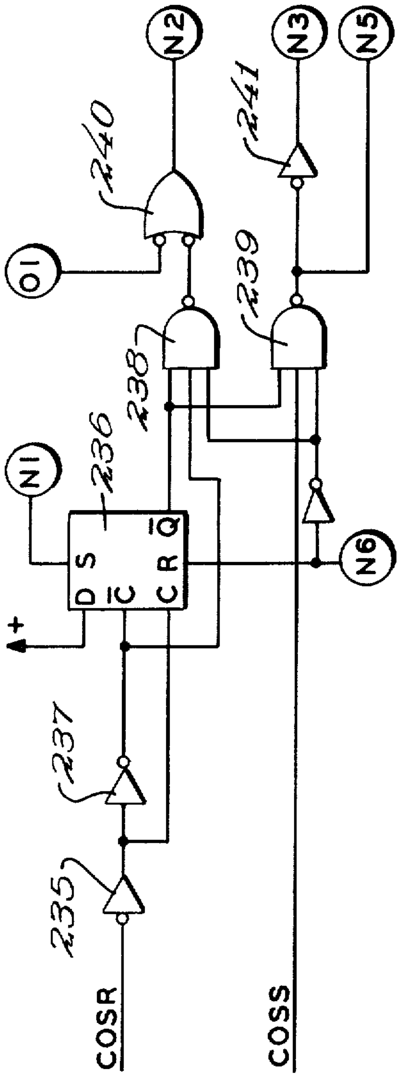

The output from each of the filters is supplied to the set terminals of a corresponding latch 212–219 which has its reset terminal R connected to terminal N2 also shown in FIG. 8J. The output from each latch supplies a corresponding ALMA-ALMD output through corresponding inverters which may then be presented to terminals H5–H9 to the control logic circuit through tristate buffers which are controlled by signal GGE. The outputs from latches 212–215 also are provided to the inputs of holding registers 220–223 respectively. The outputs from latches 216–219 provide the BTBLA-BTBLD outputs through corresponding inverters which are again shown in circuit 155 of FIG. 6F and may be presented to terminals H9–I3 connected to the control logic circuit through appropriate tristate buffers also under the control of output line GGE. The outputs from latches 216–219 are also connected to corresponding holding registers 224–227. Latches 212–219 are the same so that only one of which is shown in FIG. 8C and holding registers 220–227 are the same so that only one of which is shown in FIG. 8D.

These holding registers also have a reset input from terminal N1 which is a power on reset terminal and clocking inputs from terminals N3 and N5 which are shown in FIG. 8J and will be referred to hereinafter. These holding registers are (D) type latches with an asynchronous reset. Data from the status latches 212–219 are strobed into the holding registers with a gated change of status set pulses N3 and N5. Since the flip-flop 228 of the holding register 220 stores the last status, the EXCLUSIVE OR gate 229 compares the last status with the present status such that, if they are different, gate 229 will provide an output to NOR gate 230. After the comparison is made and upon clocking, flip-flop 228 will receive the new status which is applied to its D input terminal.

The outputs from latches 224–227 are likewise applied to a NOR gate 231 with the outputs from NOR gates 230 and 231 applied to OR gate 232 which has inverted input terminals. The output from OR gate 232 is connected to one input of NAND gate 233 the other input of which is connected to terminal N6 which is shown in FIG. 8F. When NAND gate 233 receives an input over terminal N6, it will supply any of the change of status signals from holding registers 220–227 to the change of status output from circuit 155 of FIG. 6F. The change of status output is connected through an inverter to terminal J3 which is connected to the control logic.

The signal at terminal N6 is derived from the group enable signal GE received over terminal J5 from FIG. 6G to FIG. 8F indicating that this group is one which has been addressed and should present its change of status signal to the control logic circuit. Using the group enable signal to enable NAND gate 233 within circuit 155 allows up to 16 remote stations to be multiplexed together.

The outputs from holding registers 220–223 are also connected through a NOR gate 234 to provide the common alarm CALM output from circuit 155 which is connected through an inverter to terminal I9. The status information is clocked into holding registers 220–227 by terminals N3 and N5 shown in FIG. 8J. Specifically, circuit 155 receives a change of status reset signal COSR over terminal J1 from the control logic and is connected through an inverter/buffer 235 to the clock terminal of flip-flop 236 and is connected through inverter 235 and inverter 237 to the inverted clock terminal of flip-flop 236. The D terminal of flip-flop 236 is connected to a positive voltage source, its set terminal receives a signal from terminal N1 which is the power on reset terminal and the reset terminal of flip-flop 236 receives a signal over terminal N6 which is the inversion of the group gate enable signal GGE. The $\overline{Q}$ output from flip-flop 236 is supplied to one input of each of NAND gates 238 and 239 each of which receives an inverted input from terminal N6. Additionally, NAND gate 238 receives an input from the output of inverter 237 and NAND gate 239 receives an input from the change of status set signal COSS which is received from the control logic over terminal J2. The output from NAND gate 238 is connected to one of the inverted inputs of OR gate 240 the other inverted input of which receives an input from terminal 01 which is an inverted power on reset input from the circuit of FIG. 8E. The output of NAND gate 239 is inverted at 241 to supply the signal of terminal N3 and supplies directly the signal on terminal N5. The control logic shown on FIG. 8J allows a COSR or COSS pulse to appear on the gated outputs N2, N3 or N5 only after a complete cycle of a group enable line at terminal N6. After a low going transition of the group enable signal at terminal N6, the gated COSR and COSS signals are enabled as inputs to terminals N2, N3 and N5. These pulses will allow one COS set and one COS reset pulse to be gated to the respective registers shown in FIG. 8A. Thus, whenever an address match is detected and the group enable signal GE arises, it will trigger the circuit shown in FIG. 8J to supply one change of status set signal for triggering corresponding holding registers 220–227 and then a change of state reset signal at terminal N2 for resetting latches 212–219.

The strap select multiplexer 242 shown in FIG. 6F provides the capability of inputting 8 bits of strapping data from eight pole switch 243 over lines SSA-SSD to be read and stored in circuit 155 immediately after power on reset. Strap data indicates command option strapping for each particular zone. Since there are four zones, there are four command options. Specifically, if a relay is connected to one of the command option or alarm follow outputs shown by the screw type terminals in FIG. 6F, an appropriate switch in switch 243 must be operated. Upon a power on reset signal generated at terminal N1, scan counter 244 (FIG. 8F) is reset together with option latches 245. Counter 244 will then begin counting clock pulses generated over terminals 00 and N9 from the clock shown in FIG. 8E for generating signals through inverter/buffers to output lines SSA–SSC for addressing multiplexer 242 to read the states of switches 243. The states of these switches are then inputted to the circuit 155 over line SSD and stored in the latches 245. The input from terminal SSD is supplied through NAND gate 246 under control of terminal N8 which is also supplied from the clock shown in FIG. 8E and provides an output to an inverted input of AND gate 247 which has a second inverted input from NAND gate 248. NAND gate 248 receives an input from counter 244 for disconnecting it when the count of 8 has been reached, an input from terminal N7 which comes from the clock shown in FIG. 8E and an input from terminal N9 which also comes from the clock of FIG. 8E. This information is then stored through a corresponding NOR gate 249 in one of the latches 245.

The command logic is also shown in FIG. 8F. The point decoder 250 comprised of four NOR gates receives group enable and stop/scan inputs through NAND gate 251 and inverter 252 to the input of NAND gate 253, a command strobe input COM. ST. to another input of NAND gate 253 and an input over line 254 through another input of NAND gate 253. The decoder also receives Point Select A inverted and non-inverted inputs and Point Select B inverted and noninverted inputs. These point select inputs are addresses to select one of the four command output ports COA--COD. Specifically, the outputs from decoders 250 are connected to the clock terminals of flip-flops 255–258 which all have their D input terminals connected to the start/stop line which is shown connected to terminal I5 in FIG. 6F. The set terminal of flip-flop 255 is connected through an inverter and NAND gate 259 from the output of the corresponding latch 255. The set terminals of flip-flops 256, 257 and 258 are also similarly connected to the outputs of corresponding latches of the latch set 245. When the set up for the latches 255–258 has been complete, the start/stop status data is then strobed into the appropriate latch 255–258 under the control of the command strobe input to NAND gate 253 and the point select A and point select B inputs PSA and PSB.

For alarm follow operations, the corresponding alarm follow bit is set to a logical one by its appropriate strap. There are four straps in the eight pole switch 243 devoted to alarm follow operations, one each for the loops A–D. If, for example, it is determined that loop A shall have an alarm follow operation, the top latch of latches 245 will be set for enabling NAND gate 259 to pass through the alarm data from terminal 02 shown in FIG. 8A which represents an alarm condition. Thus, this alarm status information is jammed into the set input of the command output flip-flop 255. The command output will then go on with an alarm and off with a command off if the alarm is gone.

Figure 8I:
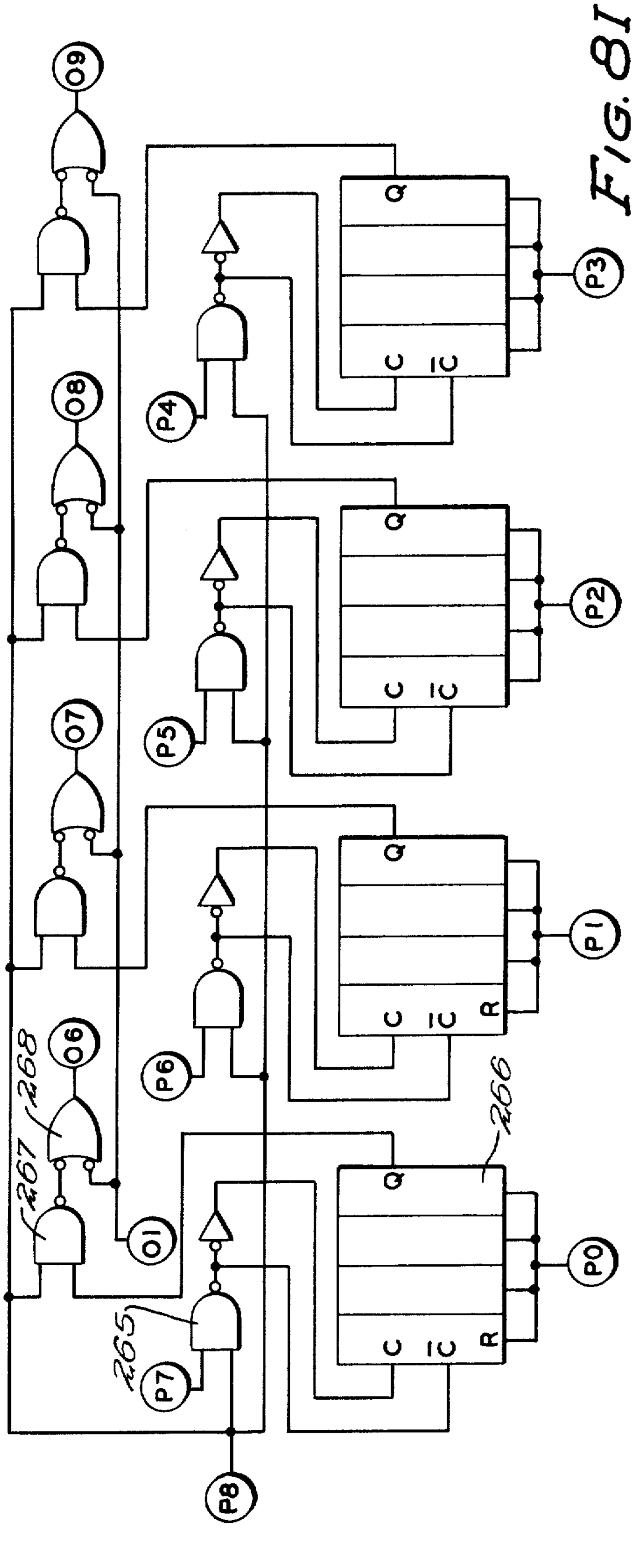

Command momentary operation is accomplished by inserting an independent timer in the jam reset line identified as terminals 06-09 of the specific command flip-flops 255–258 for which a strap has been set in switches 243. There are four switches 243 for providing this function. Assuming that the command momentary strap bit for zone A has been set, terminal P7 in FIG. 8F receives this bit and supplies it to the corresponding terminal P7 of FIG. 8I for allowing NAND gate 265 to begin passing clock pulses at terminal P8, also shown in FIG. 8F, through to counter 266 which begins counting and, at the end of its count, supplies an output to NAND gate 267 which provides an output to an inverted input of OR gate 268 for supplying a signal to terminal 06 which is used to reset latch 255. Each of the other reset terminals of the other flip-flops 256–258 have their counters and associated therewith as shown in FIG. 8I. The top four latches of latch group 245 are shown in FIG. 8G and the bottom four are shown in FIG. 8H.

In essence, therefore, the circuit 155 of FIG. 6F provides the interfacing and control of the flow of information between the alarm loops and control logic 15 shown in FIG. 1. Control logic 15 controls the flow of information through circuit 155 and controls the commands which are accomplished by the circuit 155.

FIG. 6G shows the way in which the group enable signal over terminal J5 of FIG. 6F is generated. Specifically, each remote station has associated with it a module address as established by switches 271 acting together with pull up resistors 272. These are applied to one side of comparator 273 the other side of which is connected to terminals K6–K9 from the control logic circuit. When the control logic circuit receives an address, it initiates a module scanner which addresses each specific module to pull from that module its address. Thus, comparator 273 compares the address on terminals K6–K9 with the address established by switch 271. If there is no match, no signal is generated at terminal J5 and no further action is taken by this module. If there is a match, however, comparator 273 generates the signal on terminal J5 to inform circuit 155 that this is the module that the control logic has addressed. The group enable signal on terminal J5 also supplies the address for this particular station as established by the diode set 274 to terminals J6–J9 and K1–K4. Terminal K5 is used for supplying a valid address signal to the control logic. These diodes are selectively severed to establish the remote station address. The address appearing on terminals J6–J9 and K1–K4 is then compared with the address received from the central processing unit by the control logic. Thus, when a control logic receives an address, it steps through the various function modules and supplies their individual addresses to terminals J6–J9 and K1–K4 to compare with the address received from the central processing unit. When it finds the remote station which has the same address as that received from the central processing unit, it will then take the indicated action. If not, it steps through all of the remote stations for the received address and, if the station address is not found, returns to standby status.

Figure 7A:
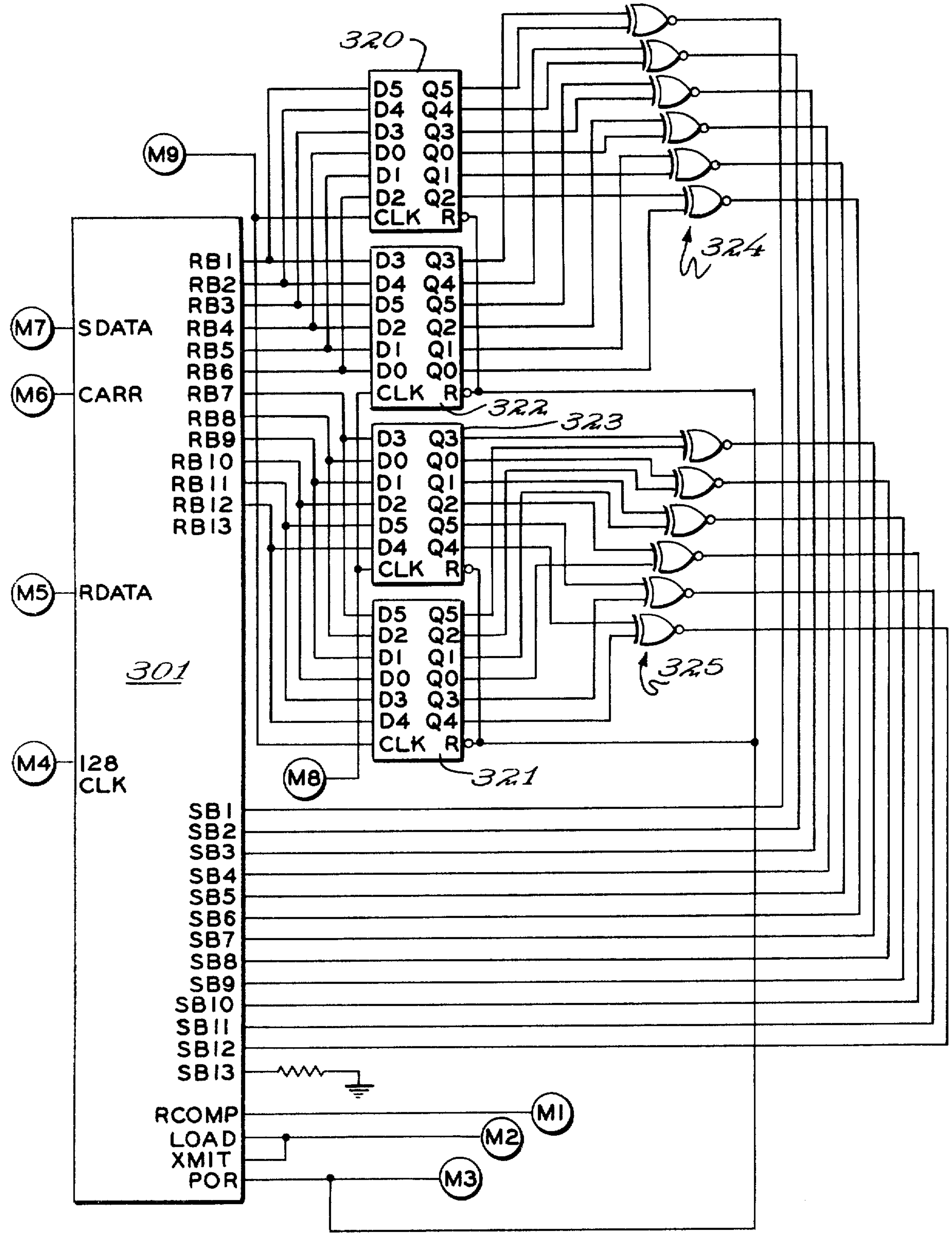
FIGS. 7A–7C show the transponder unit of FIG. 5.
Figure 7B:
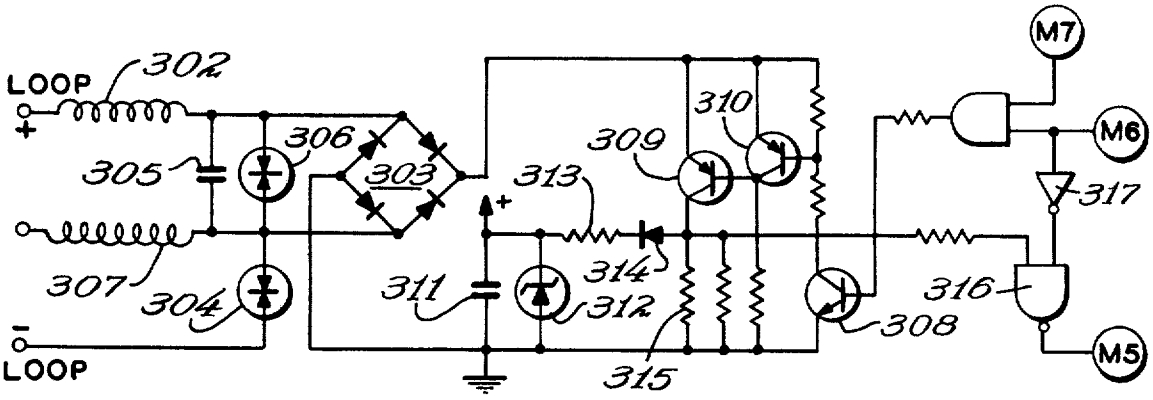
Figure 7C:
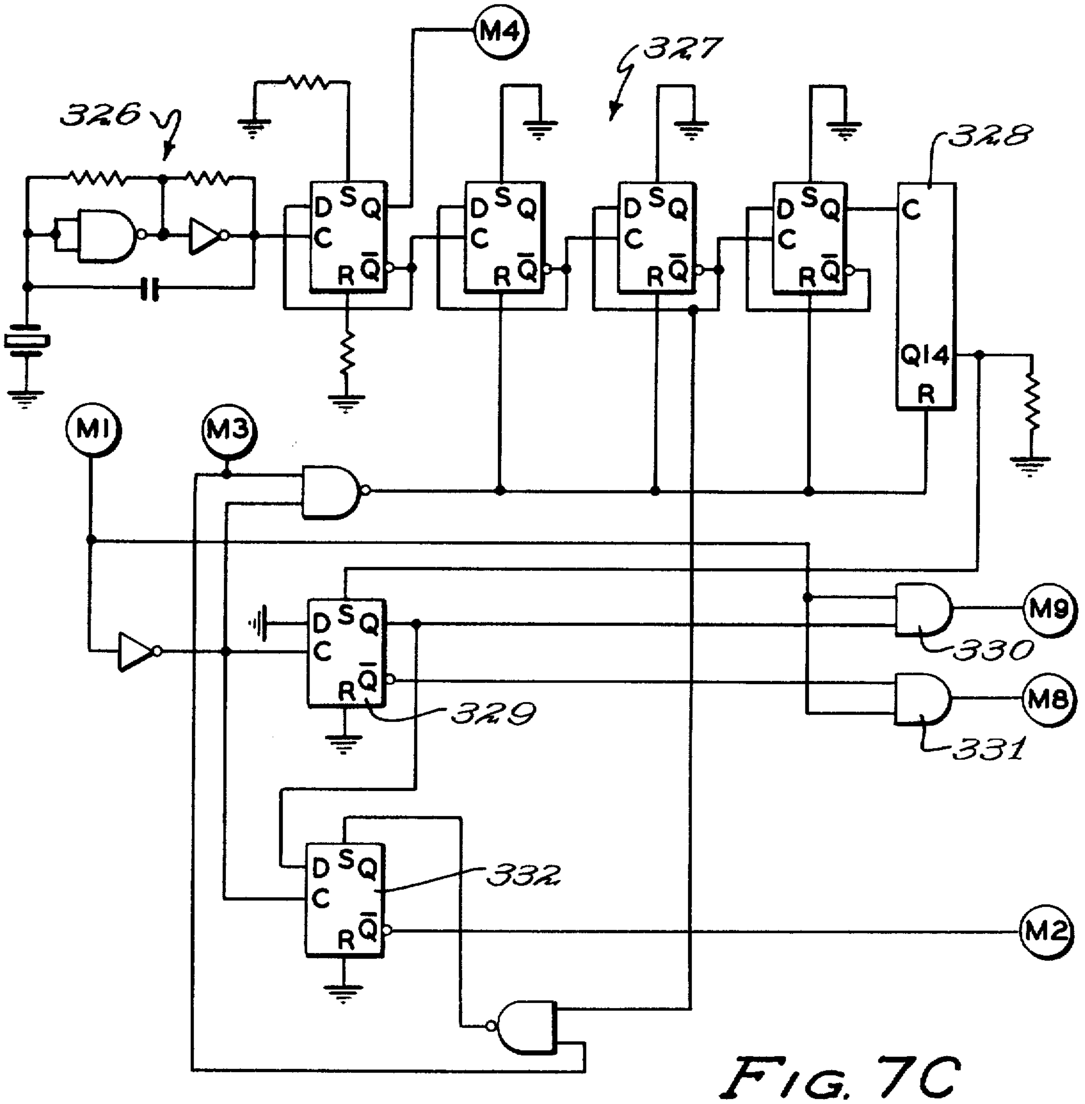

The end of line transponder for each loop is shown in FIGS. 7A–7C. The transponder is a two wire device designed to be utilized as an active end of line element. The transponder receives all power for its operation over the two wire security loop. Security loop integrity is monitored by varifying the validity of data to and/or from the transponder via the loop. If loop compromise should occur, depending upon the type of compromise, either the transponder or the remote station will initiate an alarm.

The transponder centers around the standard Honeywell universal asynchronous receiver transmitter 301 shown in FIG. 7A. This device receives data over terminal M5 which terminal is also shown in FIG. 7B. The receive section of the transponder is connected to the plus and minus terminals of the loop as shown. The plus terminal loop is connected through an inductor 302 to one input terminal of bridge 303 the other input terminal of which is connected through a bidirectional Zener diode 304 to the negative loop terminal. Capacitor 305 and bidirectional Zener diode 306 are connected across the input terminals of bridge 303. An inductor 307 is connected to the junction of diodes 306 and 304 for an alternative connection to the loop's positive terminal. Inductors 302 and 307, capacitor 305 and bidirectional Zener diodes 304 and 306 provide static protection for the circuit shown in FIG. 7B.

Data transmission of the loop is accomplished by changing the current in the loop from, for example, approximately 2.5 milliamps for a logical 0 to a 25 to 30 milliamp current signal, for example, for a logical 1. For a logical 1, transistor 308 is off, transistor 309 is on and transistor 310 is off and for a logical 0, transistor 308 is on, transistor 309 is off and transistor 310 is on. These transistors are controlled by the ANDed M6 and M7 terminals which are shown in FIG. 7A as the carrier signal and the send data terminals.

During the listening mode, transistor 309 is in its normally on state and energy is stored in capacitor 311 which is connected in parallel to Zener diode 312 and to the collector of transistor 309 through resistor 313 and diode 314. Data is received by the transponder by sensing the voltage drop across resistor 315 and is provided as an input to NAND gate 316 which has its other input terminal connected through an inverter 317 to the carrier terminal M6. The output of the NAND gate 316 is connected to the receive data terminal M5 of FIG. 7A.

The transponder is a two terminal device and must store energy from the loop so that it can maintain its own logic levels during transmission to and/or from the remote station. The transponder receives practically no power during the state of transmissions and, therefore, energy must be stored in a capacitor to maintain circuit operations during this time.

As shown in FIG. 7A, the receive bit outputs of transceiver 301 are connected to latches 320, 321, 322 and 323. Latches 320 and 321 are referred to as the mask latches and latches 322 and 323 are referred to as the data latches. The outputs from latches 320 and 322 are compared by an EXCLUSIVE OR gate comparator 324 and the outputs from latches 323 and 321 are compared by an EXCLUSIVE OR gate comparator 325. The outputs from these comparators 324 and 325 are connected back to the send bit input terminals of transceiver 301. Receive bit 13 and send bit 13 are not used.

Transceiver 301 receives a clock input at terminal M4 which is a 153.6 KHz signal to control all of its clocking functions. The M4 terminal is shown in FIG. 7C and is generated by dividing down the oscillator 326 signal. The clock is further divided down by other flip-flops 327 and by a ripple counter 328.

When power is first applied to the remote station and to the end of line transponders, the remote station will send out a mask word to each of the transponders. At the initial start up of the system, the mask data flip-flop 329 is set so that it enables AND gate 330 to pass a receive complete pulse from M1 upon receipt of the first word. When the remote station sends out the mask word to the transponder shown in FIGS. 7A–7C, the word appears on bits RB1–RB12. Upon receipt of a complete word, transceiver 301 generates a receive complete signal at terminal M1 which is passed through AND gate 330 to terminal M9 for clocking the mask word into latches 320 and 321. At the trailing edge of the receive complete pulse, mask/data flip-flop 329 is toggled to enable AND gate 331 to clock into latches 322 and 323 subsequent data words. Thus, the next word that is transmitted to the transponder is a data word which will cause the transceiver 301 to generate a receive complete pulse passing through AND gate 331 to clock latches 322 and 323. At the same time, the data in latches 320 and 322 are compared by comparator 324 and the data in latches 321 and 323 are compared by comparator 325 with the results from each comparator being connected to send bits 1-12 of transceiver 301 as shown. This data is loaded into and transmitted from the transceiver 301 by a load and transmit pulse at terminal M2. This pulse is generated by flip-flop 332 which is toggled by the clock shown in FIG. 7C.

The circuit in FIG. 7C also performs a watchdog timing function which is obtained from the Q14 output of ripple counter 328. This counter is reset by each receive complete pulse at terminal M1. If a receive complete signal is not generated in, for example, 427 milliseconds, the counter will reset the mask and data latches. This feature is designed to notify the function module if two complete transmission cycles occur and a receive complete pulse is not generated. If after this time out, a receive complete signal is generated, the resultant word will be invalid and will trigger an alarm.

The control logic circuitry is shown in FIGS. 9A-9G. The basis operation of the control logic is to serve as a formatting buffer between 1 to 16 remote stations and the central processing unit 11 shown in FIG. 1. When valid data is received by the control module, the data is latched in and presented to several decoders. A decision is made as to what type of data word was received and what appropriate action is to be taken. The control logic circuit will interface with any standard Alpha/Delta 1000 transmission line interface 14. A transmission line interface socket 401 is provided to connect the universal asynchronous receiver transmitter 402 of the control logic to the transmission line interface circuit 14 shown in FIG. 1. The system clock for transceiver 402 as well as the rest of the control logic is provided by the transmission line interface. The clock signal is brought into the control logic through the clock terminal as indicated.

Terminals H5, H9, H6, I1, H7, I2, H8 and I3, which come from circuit 155 of FIG. 6F, are inputs to transceiver 402 through corresponding buffers. These terminals are connected, according to the format shown in FIG. 2, to the send bits SB3, SB4 and SB7-SB12 as shown. The series resistor are included as current limiters for transient protection on the inputs of the buffers.

A ground fault detection circuit is included in the control logic and is comprised of a resistance divider 403 which floats earth ground to a potential approximately one half of the supply potential. Any circuit faults to earth ground then represents a parallel impedance with one of the two resistors forming the voltage divider and causes a shift of the earth ground float potential. This voltage divider 403 inputs the inverting terminal of comparator 404 and the non-inverting terminal of comparator 405. The other terminals of these two comparators are connected to set point resistance divider 406. The output from this detection circuit is then connected to SB13 of transceiver 402. Thus, in the reporting word from the control logic through the TLI module to the central processing unit, bit 13 represents a ground fault indication as shown in FIG. 2.

Battery supervision is provided by circuit 407 wherein the battery terminal potential is monitored through the resistive divider 408. A voltage divider 409 inputs one terminal of comparator 410 the other input of which is connected by resistive divider 408 to the battery terminal. Low battery potential is ANDed by AND gate 411 with a power failure signal from circuit 412 and is connected to send bit SB2 of transceiver 402 and is included in the reporting message to the central processing unit as shown in FIG. 2. Also as shown and discussed above, send bit SB1 is sent as a logic 0, send bits SB3 and SB4 represent alarm and trouble signals for loop 1, bits SB5 and SB6 are strapped to a one, bits SB7 and SB8 represent alarm and trouble data for loop 2, bits SB9 and SB10 represent alarm and trouble data for loop 3 and bits SB11 and SB12 represent alarm and trouble data for loop 4. When the data inputted to send bits SB1-SB13 is to be transmitted, a load pulse is generated at terminal S7 to load this data into the registers of transceiver 402 and then a transmit pulse is generated through the TLI module and then back to transceiver 402 for transmitting this information out over the send data line SDATA.

Control logic 15 can receive words over the receive data input RDATA of transceiver 402 and displays these receive bits on RB1-RB13 as shown, with RB13 not used. When reception has been completed, a receive complete signal RCOMP is generated for clocking the word that has been received into latches 413 and 414 which then presents this data to terminals R4-R9 and S1-S6. When power is initially applied to the system, a power on reset signal terminal I8 operates through NOR gate 415 for resetting latches 413 and 414.

All data received by transceiver 402 and stored in holding latches 413 and 414 can be classified into three distinct word types—the address word, the command word and the data word. The high security remote station, however, ignores all data words so that the transceiver 402 really receives only two useful types of words.

The first word type is the address word which consists of the group address and an address word type identifier. There are 3 subtypes of this address word type, as shown in FIG. 3. The first subtype is a polling word which requires the control logic to transmit back the status information of the addressed remote station if there has been a change in status of any of the associated four loops or to echo back the group address word if there has been no change of status. The second subtype is a demand word which requires the control logic to transmit back to the central processing unit the status of the addressed remote station regardless of whether or not there has been a change of status. The third subtype is a command word next word which sets the command latch in preparation for a command word.

The second type of word is the command word which consists of a point address, start stop data and intercom on data and requires the addressed point of the previously addressed remote station to perform some operation.

Figure 9A:
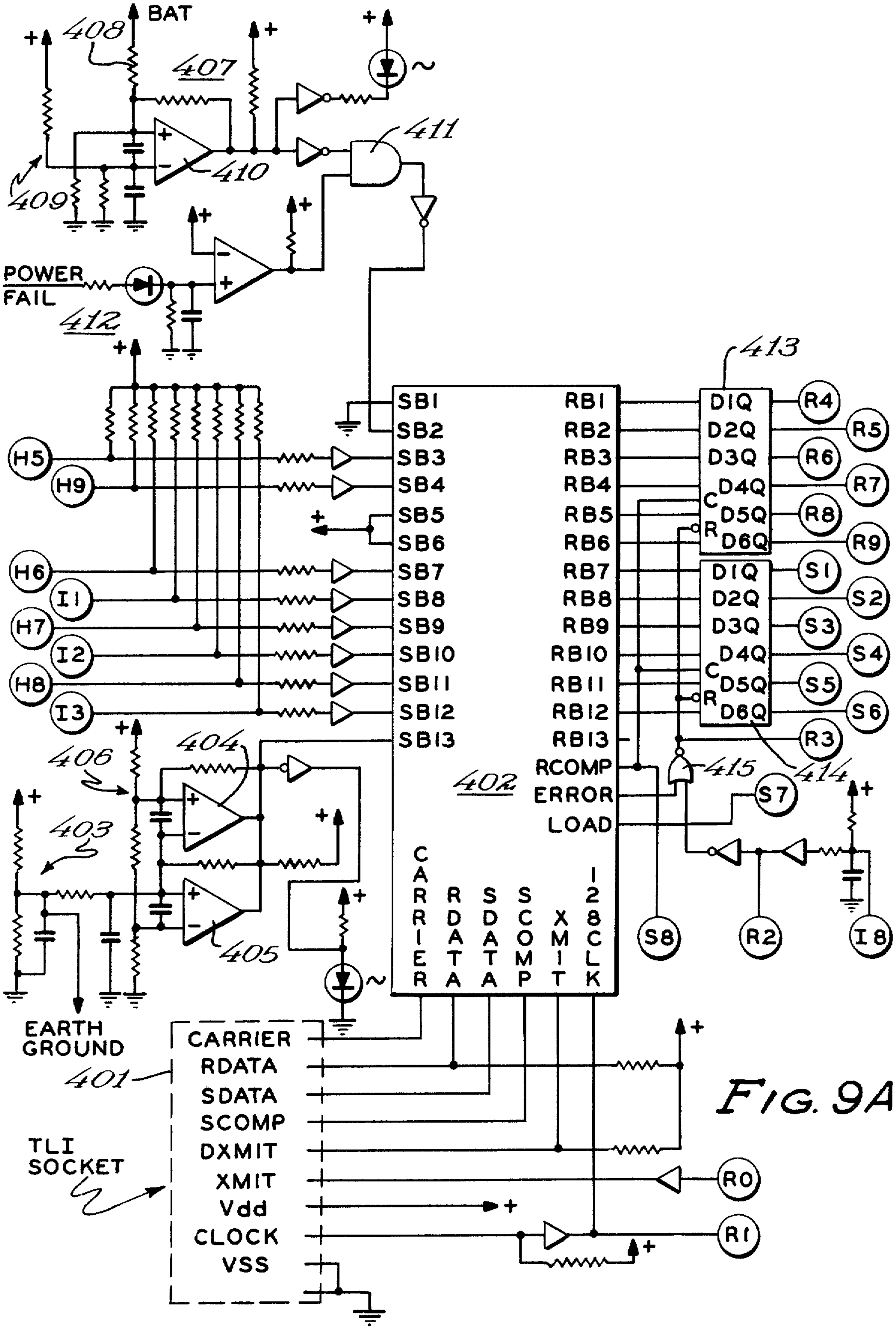
FIGS. 9A–9G show the control logic circuit of FIG. 1.
Figure 9B:
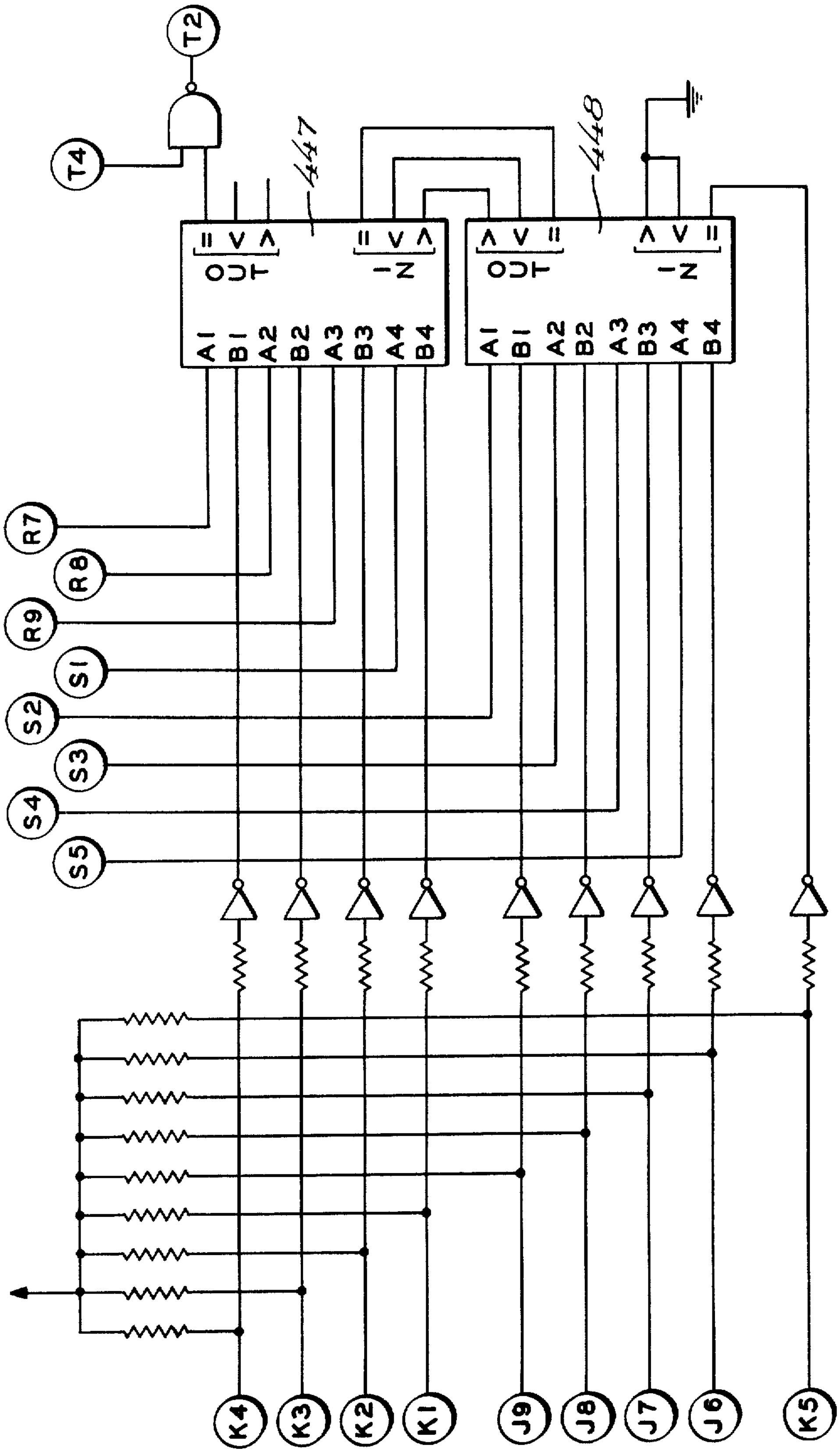
Figure 9C:
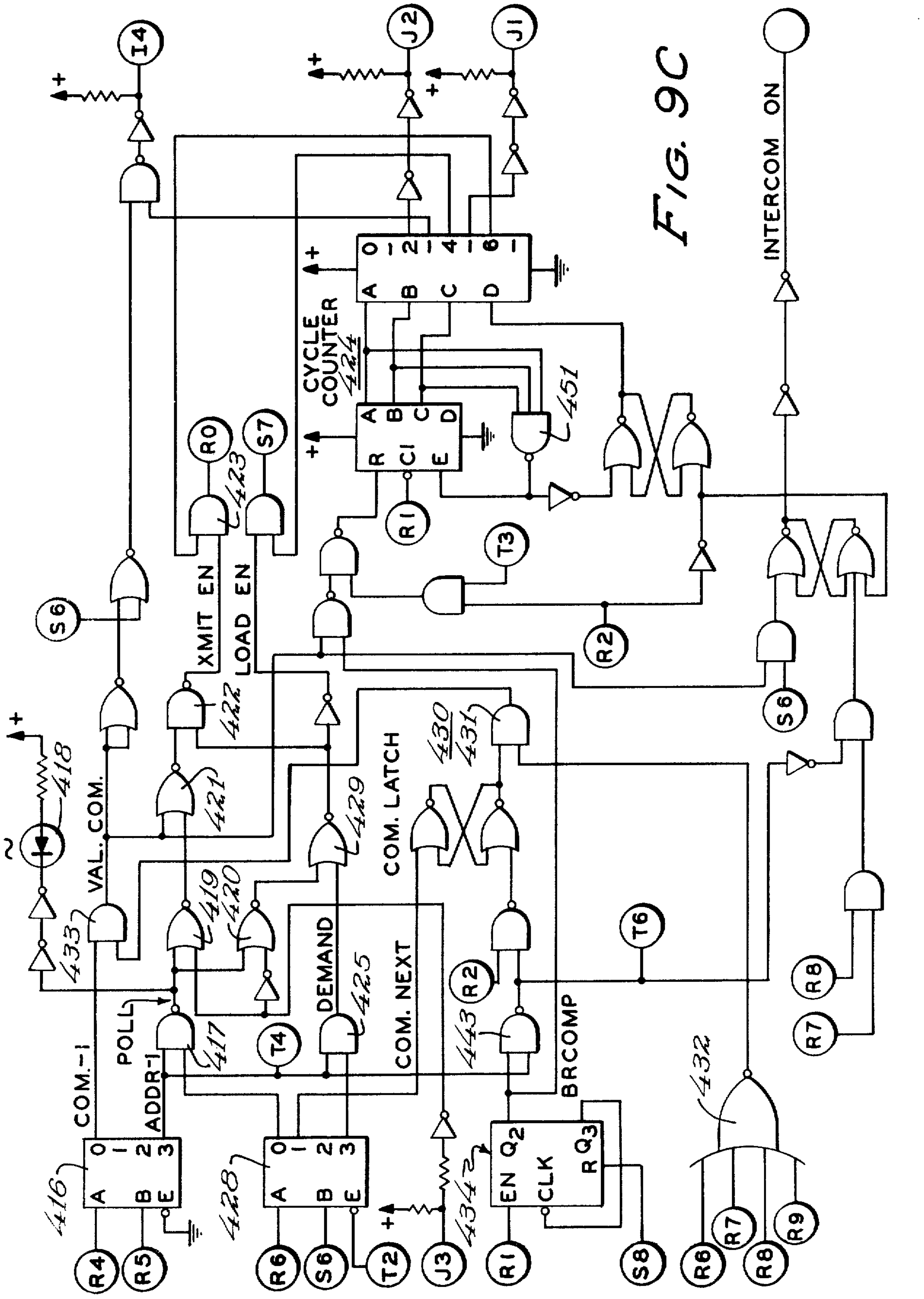
Figure 9D:
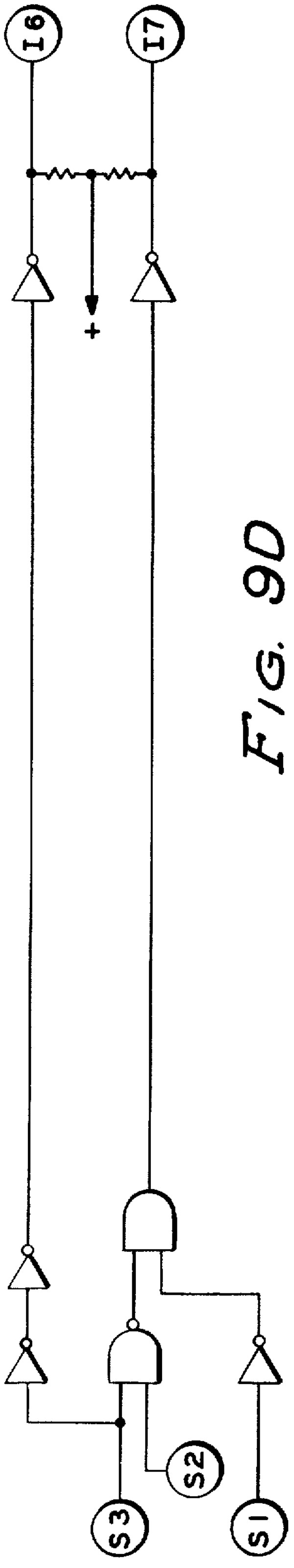

In FIG. 9C, decoder 416 decodes bits 1 and 2 from transceiver 402 to determine whether the word that has been received is an address word or a command word. If it is an address word, an output is supplied by output 3 from decoder 416 to enable NAND gates 417, 425 and 443. Decoder 428, by looking at bits 3 and 12, then determines whether the address word is a polling word, a command word next word or a demand word. If it is a polling word, decoder 428 supplies an output on its O output line which is passed through enabled NAND gate 417 to energize light emitting diode 418 to indicate that a polling operation is being conducted and also to enable NOR gate 419 to pass through any change of status information on terminal J3 from circuit 155 of FIG. 6F. The output from NAND gate 417 is also connected to one input of NOR gate 420 to be passed therethrough only if gate 420 is enabled by an inverted input from terminal J3. The output from NOR gate 420 is connected to the input of NOR gate 429 the other input of which is connected from demand NAND gate 422 which is enabled by the address one output of decoder 416 to pass through output 3 of decoder 428 indicating whether or not a demand is made. Circuit 428 decodes bits 3 and 12 of the word shown in FIG. 3. It should be noted that the decoder 428 will not be enabled unless there is a valid group address signal generated at terminal T2 by the circuit in FIG. 9B to be discussed hereinafter. Thus, no action is taken if the address which is received by transceiver 402 does not match with the addresses of any of the remote stations of DGP 13. Thus, this circuit is arranged such that if the address word is a polling word, and if there is no change of status, NOR gate 420 will not supply a load enable pulse through NOR gate 429 whereas NOR gate 419 will supply a transmit enable signal through NOR gate 421 and NAND gate 422. Terminal R0 is the transmit terminal as shown in FIG. 9A. As a result, the word that is stored in the registers in the transceiver 402, which is the address word, will be sent back to the central processing unit to indicate to the central processing unit that there was no change of status. If there has been a change of status, a load enable signal will be supplied to terminal S7 by NOR gates 420 and 421 to load the data on terminals H5–H9 and I1–I3 of FIG. 9A into the transmit registers of transceiver 402 for transmission when a transmit pulse is received.

If, on the other hand, the address word received by transceiver 402 is a demand address word, both a transmit and a load pulse at terminals R0 and S7 will be generated through NOR gate 429 respectively. Cycle counter 424 controls the timing for the supply of these pulses to transceiver 402 with the load pulse occurring first and then the transmit pulse, regardless of whether or not there is a change of status.

When a command word next signal is received, decoder 428 supplies an output over output 1 to command latch 430 which sets this latch to enable NAND gate 431 to pass through the signal from NOR gate 432 when a command word is received. The first six bits of a command word are 0's which produces an output from NOR gate 432, through NAND gate 431, and to the input of AND gate 433 which, together with the command output from decoder 416, supplies a valid command output.

When a receive complete signal is generated by transceiver 402 at terminal S8 indicating that a complete word has been received, an input is provided to the reset terminal of counter 434 which then counts the clock pulses at terminal R1 and stops incrementing after 4 clock pulses. generating a delayed, buffered receive complete pulse (BRCOMP).

When the control logic circuit receives a command word, the command word as shown in FIG. 4 contains the point address in bits 7–9. These are decoded by the circuit shown in FIG. 9D to provide the point select A and B inputs to terminals I6 and I7 of circuit 155 shown in FIG. 6F.

When the DGP 13 receives an address word, the control logic circuit interrogates all of the remote stations within the data gathering panel looking for the corresponding remote station address. The interrogation of the remote stations for the remote station addresses is controlled by the scanner shown in FIG. 9E. Each remote station has a unique module address consisting of a 4 bit binary code. The scanner outputs a binary word sequence which corresponds to all valid module address codes. When a remote station detects its module address code on the data bus, it responds with a nine bit code containing its remote station address and a single bit valid group signal. The valid group signal is used to enable the remote station address comparator and signals that data on the bus is now valid.

Upon power on reset or upon the detection of a transmission error an output is provided at terminal R3 for resetting latches 413 and 414, resetting scan flip-flop 440 and resetting module 441 through NAND gate 442. If, however, a valid address word is received by transceiver 402, a signal is generated by decoder 416 to the input of NAND gate 443 which supplies an output to reset command latch 430 and for setting scan flip-flop 440 shown in FIG. 9E over terminal T6. The signal at terminal T6 also resets reset scan flip-flop 448 and counter 441 from NAND gate 442. The toggling of scan flip-flop 440 enables delay circuit 444 to count two pulses from divider 445–446 to enable the group counter. The group counter starts with all 4 outputs at a logical 0 level. These outputs are inverted by 4 bus drivers and presented to terminals K6–K9 which are also shown in FIG. 6G for comparing the module address as established by switch 271 with the output from counter 441. That remote station which has the same module address as that on terminal K6–K9 will generate a group enable signal from the output of comparator 273 on terminal J5 for supplying the remote station address as established by diode set 274 on terminals J6–J9 and K1–K4 to the circuit of FIG. 9B along with the valid station address at terminal K5. Comparators 447 and 448 compare the address from this first remote station with the address on terminals R7–R9 and S1–S5. If there is no coincidence between the two addresses, the group counter increments and the next card locaton is interrogated by pulling its remote station address out on terminals J6–J9 and K1–K4 for comparison with the remote station address of the word received by transceiver 402. Upon a coincidence, a valid address signal is generated at terminal T2 of FIG. 9B which is then supplied through NOR gate 450 of FIG. 9E to reset scan flip-flop 440 and terminate the counting by counter 441. If no coincident group address is found, the group counter continues to increment until all 16 remote stations have been interrogated. The down transition of the output D from counter 441 is used to toggle reset scan flip-flop 448 for resetting scan flip-flop 440 and terminating the count.

Cycle counter 424 is initiated whenever a valid command word has been received or a valid group address has been obtained. The timing cycle consists of the generation of a series of 5 sequential non-overlapping pulses. These pulses are supplied to terminal J1 of FIG. 6F which is the change of status reset input, J2 which is the change of status set pulse, I4 which is the command strobe input of FIG. 6F, and enables the transmit and load signals of terminals R0 and S7. After this counter has incremented to a count of 7, NAND gate 451 disables the counter. Thus, when transceiver 402 receives an address word, the remote stations are interrogated to determine whether or not the address of the received word coincides with a station address of one of the remote stations. If it does, decoder 428 is enabled to permit the control logic to take the action indicated by the address word. If it is a polling word, only a transmit pulse is generated at terminal R0 if there has been no change of status of the remote station which has the proper station address. If there has been a change of status, both a transmit and a load pulse will be generated at respective terminals R0 and S7 to load in the new status and to transmit this information back to the central processing unit. If the word received by transceiver 402 is a demand word, a load signal is generated at terminal S7 to load in the status of the remote station and then a transmit signal is generated under control of the cycle counter 424 for transmitting this information back to the central processing unit.

If the address word received by transceiver 402 indicates that a command word is to follow, the command latch 430 is set and passes through the command word signal. The circuit in FIG. 9D decodes the point address and supplies this information to circuit 155 of FIG. 6F for causing the specific point which has been addressed to take the proper action which, as shown by FIG. 4, may be a start/stop operation or an intercom operation.

Figure 9F:
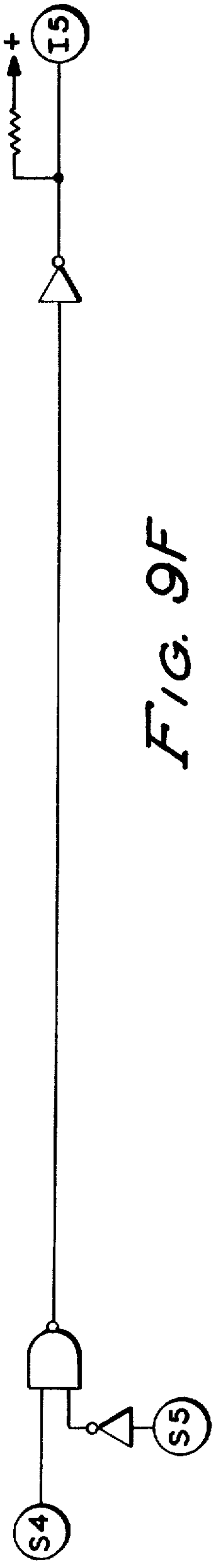
Figure 9G:
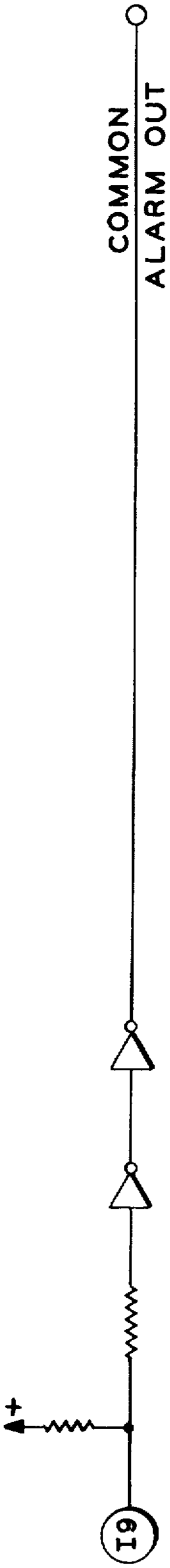
Figure 9E:
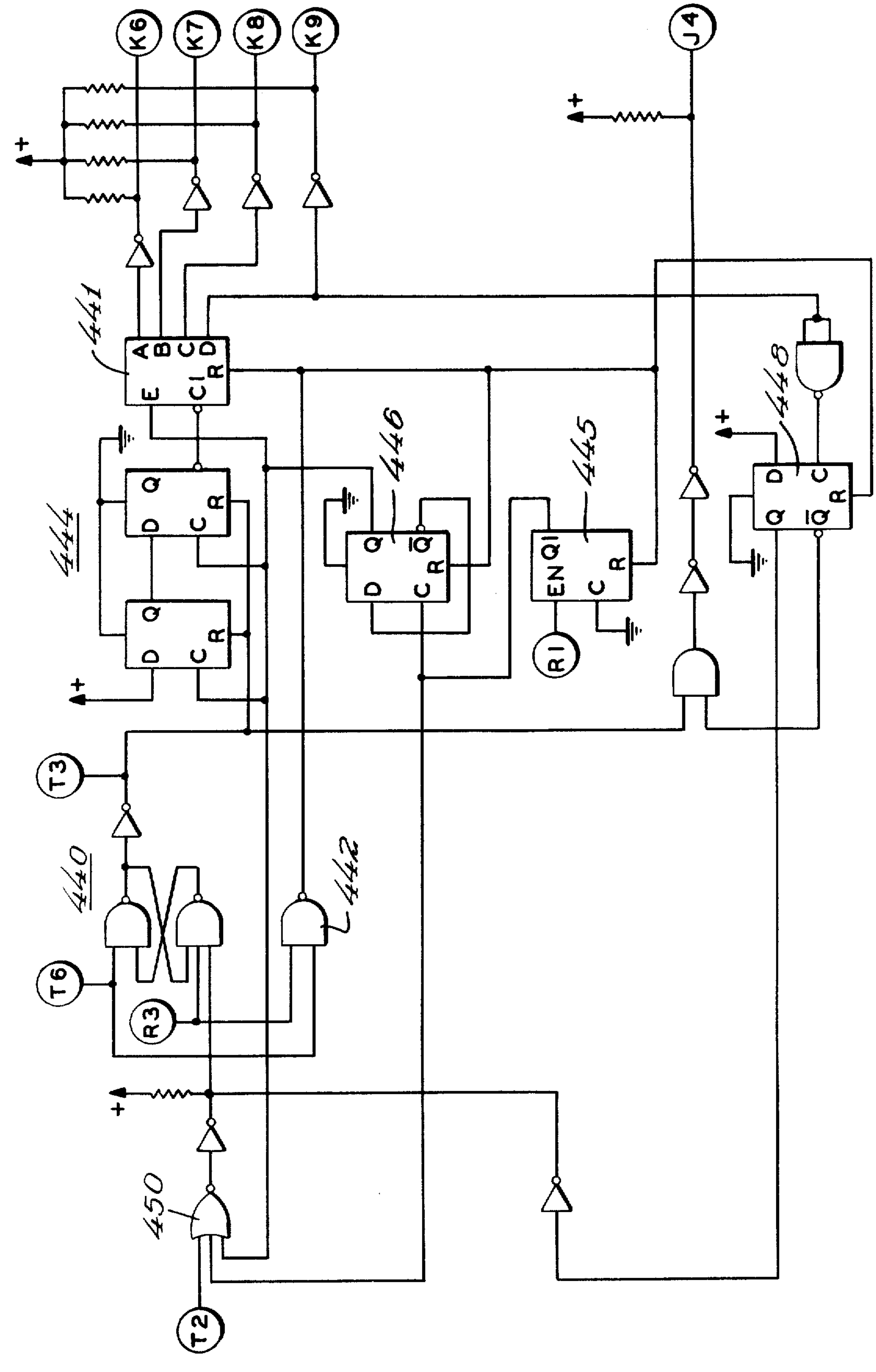

The circuit of FIG. 9F decodes bits 10 and 11 of the command word shown in FIG. 4 to determine whether a start/stop operation is to be undertaken at terminal I5 of FIG. 6F. The circuit of FIG. 9G receives the common alarm output from the circuit of FIG. 6F at terminal I9 for providing a common alarm output.

Microprocessor 124 together with its associated RAM contains the program for governing the integrity supervision function provided by the device disclosed herein. FIG. 10 shows a flow chart of the program which controls the generation of the random words and the transmission of those words to the transponder and the program listing is contained in an appendix attached hereto. The program first proceeds to initialize each of the loops under control of the microprocessor for transmitting the mask or first randomly generated word to the transponder at the end of each loop. After each loop has received the mask word, the program then generates data words to be compared both at the transponder and by the microprocessor to the mask word with the results of the two comparisons compared against each other to provide an alarm if the integrity of the loop has not been maintained.

Specifically as shown in FIG. 10, when power is initially applied to the system, an initialization subroutine is entered for accomplishing such tasks as initializing the RAM, turning off all alarm outputs, energizing the initialization LED, and resetting the receive complete latch 129 shown in FIG. 6B. Once all of these housekeeping tasks have been accomplished, the program proceeds to decide whether a loop is waiting to be initialized. If the first loop to be initialized is still waiting to be initialized, the wait time is decremented, and the system proceeds to the next loop to determine whether it is waiting for initialization. If the loop is not waiting for initialization, i.e. it is now ready to be initialized, a random number is obtained by using the random number sub-routine and it is sent to the loop which is being initialized under the Talk With Loop routine. At this point, a check is made to see if the loop is really being initialized. If it is, then the word that was just sent out is a mask word to be stored as such in the microprocessor. The routine then goes to the next loop.

However, if this transmission was not an initialization attempt, then it was the transmission of a data word and the microprocessor can expect a return word received from the end of line transponder. As pointed out above, the transponder compares the mask word to the data word and sends back the result in the form of a fourth word. When this fourth word is received, the program checks to see if the reception is correct by checking the received complete output from transceiver 111 in FIG. 6B. If the reception is not correct, no received complete bit will be available at the output from transceiver 111. If there is a received complete bit at the output of transceiver 111, then the program compares the mask word and the data word which have been stored in the microprocessor and compares the result of this comparison to the fourth word which is received back from the transponder to check for validity. If invalid, an error flag is set and the program proceeds to the next loop.

If reception was not correct, a determination is made to see if this error is the second error in transmission. If not, an error flag is set and the program increments to the next loop. If this error was the second error, then a reinitialization attempt is made by sending out a mask word and then subsequently sending out a data word to check again for errors. Also, an alarm flag is set and the program increments to the next loop.

Thus, at the decision to determine whether the loop is really initialized, if the word sent out is the first word and thus, by definition, the mask word, the mask word is saved in an appropriate register in the microprocessor, one for each of the loops controlled by the microprocessor. When all four loops have been thusly initialized, the next word that is sent out is not sent during an initialization routine and is thus a data word such that the microprocessor then checks to see whether the reception is correct and to see whether or not a valid word has been received back. If no valid word has been received back, an alarm is initiated.

The embodiments of the invention in which an exclusive property or right is claimed are defined as follows:

1. A communication system for communicating between a central processing unit and remote stations comprising:

central processing means for transmitting remote station address messages;

a communication line connected to said central processing unit for conveying said remote station address messages;

data gathering apparatus means connected to said communication line for receiving said remote station address messages, said data gathering apparatus means including a plurality of remote stations, each station having module address means for storing a module address unique to said remote station, and remote station address means for storing a remote station address unique to said remote station, control logic means having sequencing means for sequentially supplying module addresses to said remote stations, each of said remote stations comprising module address comparator means connected to said module address means and to said control logic for supplying to said control logic the remote station address when there is a match between the module address stored in the remote station and the module address generated by said control logic means, remote station address comparator means for comparing the remote station address received from said central processing means to the remote station address of the selected remote station.

2. The system of claim 1 wherein said module address means includes a plurality of switches for uniquely identifying its associated remote station.

3. The system of claim 2 wherein said sequencing means comprises a counter for sequentially generating the module addresses of all remote stations in said data gathering apparatus means.

4. The system of claim 1 wherein said comparator means for comparing module addresses is connected to said counter and to said plurality of switches.

5. The apparatus of claim 4 wherein said module address comparator means comprises an output for energizing said remote station address means to supply said remote station address to said control logic means.

6. The system of claim 5 wherein said remote station address means comprises a plurality of diodes connected between said output from said module address comparator means and said remote station address comparator means wherein said diodes determine said remote station addresses.

7. The system of claim 6 wherein said control logic means comprises decoding means for decoding the type of address received from the central processing means.

8. The system of claim 7 wherein said decoding means includes a decoder for generating transmit and load pulses to transmit and load status information upon a change of status, to generate transmit and load pulses to transmit and load status information on demand, and to generate only the transmit pulse if there has been no change of status in the remote station.

9. The system of claim 8 wherein said remote station address comparator means has an output for enabling said decoder only when said remote station receives its address from the central processing means.

10. The system of claim 9 wherein said control logic means comprises means for energizing said sequencing means whenever a remote station address is received from said central processing means.

11. The system of claim 10 including transceiver means responsive to said transmit and load pulses for transmitting status and demand information back to the central processing means.

* * * * *